United States Patent
Itoh

(10) Patent No.: US 6,980,701 B1
(45) Date of Patent: Dec. 27, 2005

(54) IMAGE PROCESSING METHOD AND APPARATUS CAPABLE OF ROTATING AND REVERSING AN INPUT IMAGE

(75) Inventor: Naotsugu Itoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 832 days.

(21) Appl. No.: 09/895,185

(22) Filed: Jul. 2, 2001

(30) Foreign Application Priority Data

| | | |
|---|---|---|
| Jul. 5, 2000 | (JP) | 2000/203883 |
| Jul. 5, 2000 | (JP) | 2000/203884 |

(51) Int. Cl.[7] .............................................. G06K 9/36
(52) U.S. Cl. ...................... 382/296; 382/298; 358/451
(58) Field of Search ................................ 382/293, 296, 382/295, 297, 298; 358/448, 443, 1.1, 2.1, 358/1.9, 3.1, 3.11, 3.12, 447, 451, 452

(56) References Cited

U.S. PATENT DOCUMENTS 4,929,085 A * 5/1990 Kajihara ...................... 345/658
5,563,625 A * 10/1996 Scott .......................... 345/658

* cited by examiner

Primary Examiner—Jerome Grant, II
(74) Attorney, Agent, or Firm—Fitzpatrick, Cella, Harper & Scinto

(57) ABSTRACT

An image processing apparatus provides numerical signal generator for sequentially generating and outputting regular binary numerical signals synchronous with clock signal, bit exchanger for generating and outputting, from the output signal of the numerical signal generator being managed as input signal, signal that order of bits in the input signal has been exchanged or signal that the bits in the input signal have been reversed, controller for controlling the bit order exchange operation or the bit reversal operation of the bit exchanger, and storage for storing image data, and in the apparatus the image data divided into pixel data and one-dimensionally arranged and stored in the storage is read and output synchronous with the sequential operation of the numerical signal generator, and the output signal from the bit exchanger is read and output as address signal to perform rotation/reversal process to former image.

13 Claims, 22 Drawing Sheets

FIG. 7

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |
| 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 |
| 176 | 177 | 178 | 179 | 180 | 181 | 182 | 183 | 184 | 185 | 186 | 187 | 188 | 189 | 190 | 191 |
| 192 | 193 | 194 | 195 | 196 | 197 | 198 | 199 | 200 | 201 | 202 | 203 | 204 | 205 | 206 | 207 |
| 208 | 209 | 210 | 211 | 212 | 213 | 214 | 215 | 216 | 217 | 218 | 219 | 220 | 221 | 222 | 223 |
| 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 |

FIG. 8

| 15 | 31 | 47 | 63 | 79 | 95 | 111 | 127 | 143 | 159 | 175 | 191 | 207 | 223 | 239 | 255 |
|----|----|----|----|----|----|-----|-----|-----|-----|-----|-----|-----|-----|-----|-----|
| 14 | 30 | 46 | 62 | 78 | 94 | 110 | 126 | 142 | 158 | 174 | 190 | 206 | 222 | 238 | 254 |
| 13 | 29 | 45 | 61 | 77 | 93 | 109 | 125 | 141 | 157 | 173 | 189 | 205 | 221 | 237 | 253 |
| 12 | 28 | 44 | 60 | 76 | 92 | 108 | 124 | 140 | 156 | 172 | 188 | 204 | 220 | 236 | 252 |
| 11 | 27 | 43 | 59 | 75 | 91 | 107 | 123 | 139 | 155 | 171 | 187 | 203 | 219 | 235 | 251 |
| 10 | 26 | 42 | 58 | 74 | 90 | 106 | 122 | 138 | 154 | 170 | 186 | 202 | 218 | 234 | 250 |
| 9  | 25 | 41 | 57 | 73 | 89 | 105 | 121 | 137 | 153 | 169 | 185 | 201 | 217 | 233 | 249 |
| 8  | 24 | 40 | 56 | 72 | 88 | 104 | 120 | 136 | 152 | 168 | 184 | 200 | 216 | 232 | 248 |
| 7  | 23 | 39 | 55 | 71 | 87 | 103 | 119 | 135 | 151 | 167 | 183 | 199 | 215 | 231 | 247 |
| 6  | 22 | 38 | 54 | 70 | 86 | 102 | 118 | 134 | 150 | 166 | 182 | 198 | 214 | 230 | 246 |
| 5  | 21 | 37 | 53 | 69 | 85 | 101 | 117 | 133 | 149 | 165 | 181 | 197 | 213 | 229 | 245 |
| 4  | 20 | 36 | 52 | 68 | 84 | 100 | 116 | 132 | 148 | 164 | 180 | 196 | 212 | 228 | 244 |
| 3  | 19 | 35 | 51 | 67 | 83 | 99  | 115 | 131 | 147 | 163 | 179 | 195 | 211 | 227 | 243 |
| 2  | 18 | 34 | 50 | 66 | 82 | 98  | 114 | 130 | 146 | 162 | 198 | 194 | 210 | 226 | 242 |
| 1  | 17 | 33 | 49 | 65 | 81 | 97  | 113 | 129 | 145 | 161 | 177 | 193 | 209 | 225 | 241 |
| 0  | 16 | 32 | 48 | 64 | 80 | 96  | 112 | 128 | 144 | 160 | 176 | 192 | 208 | 224 | 240 |

FIG. 9

| 255 | 254 | 253 | 252 | 251 | 250 | 249 | 248 | 247 | 246 | 245 | 244 | 243 | 242 | 241 | 240 |
|---|---|---|---|---|---|---|---|---|---|---|---|---|---|---|---|
| 239 | 238 | 237 | 236 | 235 | 234 | 233 | 232 | 231 | 230 | 229 | 228 | 227 | 226 | 225 | 224 |
| 223 | 222 | 221 | 220 | 219 | 218 | 217 | 216 | 215 | 214 | 213 | 212 | 211 | 210 | 209 | 208 |
| 207 | 206 | 205 | 204 | 203 | 202 | 201 | 200 | 199 | 198 | 197 | 196 | 195 | 194 | 193 | 192 |
| 191 | 190 | 189 | 188 | 187 | 186 | 185 | 184 | 183 | 182 | 181 | 180 | 179 | 178 | 177 | 176 |
| 175 | 174 | 173 | 172 | 171 | 170 | 169 | 168 | 167 | 166 | 165 | 164 | 163 | 162 | 161 | 160 |
| 159 | 158 | 157 | 156 | 155 | 154 | 153 | 152 | 151 | 150 | 149 | 148 | 147 | 146 | 145 | 144 |
| 143 | 142 | 141 | 140 | 139 | 138 | 137 | 136 | 135 | 134 | 133 | 132 | 131 | 130 | 129 | 128 |
| 127 | 126 | 125 | 124 | 123 | 122 | 121 | 120 | 119 | 118 | 117 | 116 | 115 | 114 | 113 | 112 |
| 111 | 110 | 109 | 108 | 107 | 106 | 105 | 104 | 103 | 102 | 101 | 100 | 99 | 98 | 97 | 96 |
| 95 | 94 | 93 | 92 | 91 | 90 | 89 | 88 | 87 | 86 | 85 | 84 | 83 | 82 | 81 | 80 |
| 79 | 78 | 77 | 76 | 75 | 74 | 73 | 72 | 71 | 70 | 69 | 68 | 67 | 66 | 65 | 64 |
| 63 | 62 | 61 | 60 | 59 | 58 | 57 | 56 | 55 | 54 | 53 | 52 | 51 | 50 | 49 | 48 |
| 47 | 46 | 45 | 44 | 43 | 42 | 41 | 40 | 39 | 38 | 37 | 36 | 35 | 34 | 33 | 32 |
| 31 | 30 | 29 | 28 | 27 | 26 | 25 | 24 | 23 | 22 | 21 | 20 | 19 | 18 | 17 | 16 |
| 15 | 14 | 13 | 12 | 11 | 10 | 9 | 8 | 7 | 6 | 5 | 4 | 3 | 2 | 1 | 0 |

FIG. 10

| 240 | 224 | 208 | 192 | 176 | 160 | 144 | 128 | 112 | 96 | 80 | 64 | 48 | 32 | 16 | 0 |
|---|---|---|---|---|---|---|---|---|---|---|---|---|---|---|---|
| 241 | 225 | 209 | 193 | 177 | 161 | 145 | 129 | 113 | 97 | 81 | 65 | 49 | 33 | 17 | 1 |
| 242 | 226 | 210 | 194 | 178 | 162 | 146 | 130 | 114 | 98 | 82 | 66 | 50 | 34 | 18 | 2 |
| 243 | 227 | 211 | 195 | 179 | 163 | 147 | 131 | 115 | 99 | 83 | 67 | 51 | 35 | 19 | 3 |
| 244 | 228 | 212 | 196 | 180 | 164 | 148 | 132 | 116 | 100 | 84 | 68 | 52 | 36 | 20 | 4 |
| 245 | 229 | 213 | 197 | 181 | 165 | 149 | 133 | 117 | 101 | 85 | 69 | 53 | 37 | 21 | 5 |
| 246 | 230 | 214 | 198 | 182 | 166 | 150 | 134 | 118 | 102 | 86 | 70 | 54 | 38 | 22 | 6 |
| 247 | 231 | 215 | 199 | 183 | 167 | 151 | 135 | 119 | 103 | 87 | 71 | 55 | 39 | 23 | 7 |
| 248 | 232 | 216 | 200 | 184 | 168 | 152 | 136 | 120 | 104 | 88 | 72 | 56 | 40 | 24 | 8 |
| 249 | 233 | 217 | 201 | 185 | 169 | 153 | 137 | 121 | 105 | 89 | 73 | 57 | 41 | 25 | 9 |
| 250 | 234 | 218 | 202 | 186 | 170 | 154 | 138 | 122 | 106 | 90 | 74 | 58 | 42 | 26 | 10 |
| 251 | 235 | 219 | 203 | 187 | 171 | 155 | 139 | 123 | 107 | 91 | 75 | 59 | 43 | 27 | 11 |
| 252 | 236 | 220 | 204 | 188 | 172 | 156 | 140 | 124 | 108 | 92 | 76 | 60 | 44 | 28 | 12 |
| 253 | 237 | 221 | 205 | 189 | 173 | 157 | 141 | 125 | 109 | 93 | 77 | 61 | 45 | 29 | 13 |
| 254 | 238 | 222 | 206 | 190 | 174 | 158 | 142 | 126 | 110 | 94 | 78 | 62 | 46 | 30 | 14 |
| 255 | 239 | 223 | 207 | 191 | 175 | 159 | 143 | 127 | 111 | 95 | 79 | 63 | 47 | 31 | 15 |

FIG. 11

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 |
| 47 | 46 | 45 | 44 | 43 | 42 | 41 | 40 | 39 | 38 | 37 | 36 | 35 | 34 | 33 | 32 |
| 63 | 62 | 61 | 60 | 59 | 58 | 57 | 56 | 55 | 54 | 53 | 52 | 51 | 50 | 49 | 48 |
| 79 | 78 | 77 | 76 | 75 | 74 | 73 | 72 | 71 | 70 | 69 | 68 | 67 | 66 | 65 | 64 |
| 95 | 94 | 93 | 92 | 91 | 90 | 89 | 88 | 87 | 86 | 85 | 84 | 83 | 82 | 81 | 80 |
| 111 | 110 | 109 | 108 | 107 | 106 | 105 | 104 | 103 | 102 | 101 | 100 | 99 | 98 | 97 | 96 |
| 127 | 126 | 125 | 124 | 123 | 122 | 121 | 120 | 119 | 118 | 117 | 116 | 115 | 114 | 113 | 112 |
| 143 | 142 | 141 | 140 | 139 | 138 | 137 | 136 | 135 | 134 | 133 | 132 | 131 | 130 | 129 | 128 |
| 159 | 158 | 157 | 156 | 155 | 154 | 153 | 152 | 151 | 150 | 149 | 148 | 147 | 146 | 145 | 144 |
| 175 | 174 | 173 | 172 | 171 | 170 | 169 | 168 | 167 | 166 | 165 | 164 | 163 | 162 | 161 | 160 |
| 191 | 190 | 189 | 188 | 187 | 186 | 185 | 184 | 183 | 182 | 181 | 180 | 179 | 178 | 177 | 176 |
| 207 | 206 | 205 | 204 | 203 | 202 | 201 | 200 | 199 | 198 | 197 | 196 | 195 | 194 | 193 | 192 |
| 223 | 222 | 221 | 220 | 219 | 218 | 217 | 216 | 215 | 214 | 213 | 212 | 211 | 210 | 209 | 208 |
| 239 | 238 | 237 | 236 | 235 | 234 | 233 | 232 | 231 | 230 | 229 | 228 | 227 | 226 | 225 | 224 |
| 255 | 254 | 253 | 252 | 251 | 250 | 249 | 248 | 247 | 246 | 245 | 244 | 243 | 242 | 241 | 240 |

FIG. 12

| 0 | 16 | 32 | 48 | 64 | 80 | 96 | 112 | 128 | 144 | 160 | 176 | 192 | 208 | 224 | 240 |
|---|---|---|---|---|---|---|---|---|---|---|---|---|---|---|---|
| 1 | 17 | 33 | 49 | 65 | 81 | 97 | 113 | 129 | 145 | 161 | 177 | 193 | 209 | 225 | 241 |
| 2 | 18 | 34 | 50 | 66 | 82 | 98 | 114 | 130 | 146 | 162 | 178 | 194 | 210 | 226 | 242 |
| 3 | 19 | 35 | 51 | 67 | 83 | 99 | 115 | 131 | 147 | 163 | 179 | 195 | 211 | 227 | 243 |
| 4 | 20 | 36 | 52 | 68 | 84 | 100 | 116 | 132 | 148 | 164 | 180 | 196 | 212 | 228 | 244 |
| 5 | 21 | 37 | 53 | 69 | 85 | 101 | 117 | 133 | 149 | 165 | 181 | 197 | 213 | 229 | 245 |
| 6 | 22 | 38 | 54 | 70 | 86 | 102 | 118 | 134 | 150 | 166 | 182 | 198 | 214 | 230 | 246 |
| 7 | 23 | 39 | 55 | 71 | 87 | 103 | 119 | 135 | 151 | 167 | 183 | 199 | 215 | 231 | 247 |
| 8 | 24 | 40 | 56 | 72 | 88 | 104 | 120 | 136 | 152 | 168 | 184 | 200 | 216 | 232 | 248 |
| 9 | 25 | 41 | 57 | 73 | 89 | 105 | 121 | 137 | 153 | 169 | 185 | 201 | 217 | 233 | 249 |
| 10 | 26 | 42 | 58 | 74 | 90 | 106 | 122 | 138 | 154 | 170 | 186 | 202 | 218 | 234 | 250 |
| 11 | 27 | 43 | 59 | 75 | 91 | 107 | 123 | 139 | 155 | 171 | 187 | 203 | 219 | 235 | 251 |
| 12 | 28 | 44 | 60 | 76 | 92 | 108 | 124 | 140 | 156 | 172 | 188 | 204 | 220 | 236 | 252 |
| 13 | 29 | 45 | 61 | 77 | 93 | 109 | 125 | 141 | 157 | 173 | 189 | 205 | 221 | 237 | 253 |
| 14 | 30 | 46 | 62 | 78 | 94 | 110 | 126 | 142 | 158 | 174 | 190 | 206 | 222 | 238 | 254 |
| 15 | 31 | 47 | 63 | 79 | 95 | 111 | 127 | 143 | 159 | 175 | 191 | 207 | 223 | 239 | 255 |

FIG. 13

| 240 | 241 | 242 | 243 | 244 | 245 | 246 | 247 | 248 | 249 | 250 | 251 | 252 | 253 | 254 | 255 |
|---|---|---|---|---|---|---|---|---|---|---|---|---|---|---|---|
| 224 | 225 | 226 | 227 | 228 | 229 | 230 | 231 | 232 | 233 | 234 | 235 | 236 | 237 | 238 | 239 |
| 208 | 209 | 210 | 211 | 212 | 213 | 214 | 215 | 216 | 217 | 218 | 219 | 220 | 221 | 222 | 223 |
| 192 | 193 | 194 | 195 | 196 | 197 | 198 | 199 | 200 | 201 | 202 | 203 | 204 | 205 | 206 | 207 |
| 176 | 177 | 178 | 179 | 180 | 181 | 182 | 183 | 184 | 185 | 186 | 187 | 188 | 189 | 190 | 191 |
| 160 | 161 | 162 | 163 | 164 | 165 | 166 | 167 | 168 | 169 | 170 | 171 | 172 | 173 | 174 | 175 |
| 144 | 145 | 146 | 147 | 148 | 149 | 150 | 151 | 152 | 153 | 154 | 155 | 156 | 157 | 158 | 159 |
| 128 | 129 | 130 | 131 | 132 | 133 | 134 | 135 | 136 | 137 | 138 | 139 | 140 | 141 | 142 | 143 |
| 112 | 113 | 114 | 115 | 116 | 117 | 118 | 119 | 120 | 121 | 122 | 123 | 124 | 125 | 126 | 127 |
| 96 | 97 | 98 | 99 | 100 | 101 | 102 | 103 | 104 | 105 | 106 | 107 | 108 | 109 | 110 | 111 |
| 80 | 81 | 82 | 83 | 84 | 85 | 86 | 87 | 88 | 89 | 90 | 91 | 92 | 93 | 94 | 95 |
| 64 | 65 | 66 | 67 | 68 | 69 | 70 | 71 | 72 | 73 | 74 | 75 | 76 | 77 | 78 | 79 |
| 48 | 49 | 50 | 51 | 52 | 53 | 54 | 55 | 56 | 57 | 58 | 59 | 60 | 61 | 62 | 63 |
| 32 | 33 | 34 | 35 | 36 | 37 | 38 | 39 | 40 | 41 | 42 | 43 | 44 | 45 | 46 | 47 |
| 16 | 17 | 18 | 19 | 20 | 21 | 22 | 23 | 24 | 25 | 26 | 27 | 28 | 29 | 30 | 31 |
| 0 | 1 | 2 | 3 | 4 | 5 | 6 | 7 | 8 | 9 | 10 | 11 | 12 | 13 | 14 | 15 |

FIG. 14

| 255 | 239 | 223 | 207 | 191 | 175 | 159 | 143 | 127 | 111 | 95 | 79 | 63 | 47 | 31 | 15 |
|---|---|---|---|---|---|---|---|---|---|---|---|---|---|---|---|
| 254 | 238 | 222 | 206 | 190 | 174 | 158 | 142 | 126 | 110 | 94 | 78 | 62 | 46 | 30 | 14 |
| 253 | 237 | 221 | 205 | 189 | 173 | 157 | 141 | 125 | 109 | 93 | 77 | 61 | 45 | 29 | 13 |
| 252 | 236 | 220 | 204 | 188 | 172 | 156 | 140 | 124 | 108 | 92 | 76 | 60 | 44 | 28 | 12 |
| 251 | 235 | 219 | 203 | 187 | 171 | 155 | 139 | 123 | 107 | 91 | 75 | 59 | 43 | 27 | 11 |
| 250 | 234 | 218 | 202 | 186 | 170 | 154 | 138 | 122 | 106 | 90 | 74 | 58 | 42 | 26 | 10 |
| 249 | 233 | 217 | 201 | 185 | 169 | 153 | 137 | 121 | 105 | 89 | 73 | 57 | 41 | 25 | 9 |
| 248 | 232 | 216 | 200 | 184 | 168 | 152 | 136 | 120 | 104 | 88 | 72 | 56 | 40 | 24 | 8 |
| 247 | 231 | 215 | 199 | 183 | 167 | 151 | 135 | 119 | 103 | 87 | 71 | 55 | 39 | 23 | 7 |
| 246 | 230 | 214 | 198 | 182 | 166 | 150 | 134 | 118 | 102 | 86 | 70 | 54 | 38 | 22 | 6 |
| 245 | 229 | 213 | 197 | 181 | 165 | 149 | 133 | 117 | 101 | 85 | 69 | 53 | 37 | 21 | 5 |
| 244 | 228 | 212 | 196 | 180 | 164 | 148 | 132 | 116 | 100 | 84 | 68 | 52 | 36 | 20 | 4 |
| 243 | 227 | 211 | 195 | 179 | 163 | 147 | 131 | 115 | 99 | 83 | 67 | 51 | 35 | 19 | 3 |
| 242 | 226 | 210 | 194 | 198 | 162 | 146 | 130 | 114 | 98 | 82 | 66 | 50 | 34 | 18 | 2 |
| 241 | 225 | 209 | 193 | 177 | 161 | 145 | 129 | 113 | 97 | 81 | 65 | 49 | 33 | 17 | 1 |
| 240 | 224 | 208 | 192 | 176 | 160 | 144 | 128 | 112 | 96 | 80 | 64 | 48 | 32 | 16 | 0 |

FIG. 15

| IMAGE PROC CONTENTS | BIT EXCHANGE CONTENTS<br>A(i): iTH BIT IN ADDRESS OUTPUT<br>C(i): iTH BIT IN COUNTER INPUT |
|---|---|
| COUNTERCLOCKWISE 90° IMAGE ROTATION | A(7) ← C(3);<br>A(6) ← C(2);<br>A(5) ← C(1);<br>A(4) ← C(0);<br>A(3) ← not C(7);<br>A(2) ← not C(6);<br>A(1) ← not C(5);<br>A(0) ← not C(4). |
| COUNTERCLOCKWISE 180° IMAGE ROTATION | A(7) ← not C(7);<br>A(6) ← not C(6);<br>A(5) ← not C(5);<br>A(4) ← not C(4);<br>A(3) ← not C(3);<br>A(2) ← not C(2);<br>A(1) ← not C(1);<br>A(0) ← not C(0). |
| COUNTERCLOCKWISE 270° IMAGE ROTATION | A(7) ← not C(3);<br>A(6) ← not C(2);<br>A(5) ← not C(1);<br>A(4) ← not C(0);<br>A(3) ← C(7);<br>A(2) ← C(6);<br>A(1) ← C(5);<br>A(0) ← C(4). |
| IMAGE REVERSAL | A(7) ← C(7);<br>A(6) ← C(6);<br>A(5) ← C(5);<br>A(4) ← C(4);<br>A(3) ← not C(3);<br>A(2) ← not C(2);<br>A(1) ← not C(1);<br>A(0) ← not C(0). |
| COUNTERCLOCKWISE 90° IMAGE ROTATION AFTER IMAGE REVERSAL | A(7) ← C(3);<br>A(6) ← C(2);<br>A(5) ← C(1);<br>A(4) ← C(0);<br>A(3) ← C(7);<br>A(2) ← C(6);<br>A(1) ← C(5);<br>A(0) ← C(4). |
| COUNTERCLOCKWISE 180° IMAGE ROTATION AFTER IMAGE REVERSAL | A(7) ← not C(7);<br>A(6) ← not C(6);<br>A(5) ← not C(5);<br>A(4) ← not C(4);<br>A(3) ← C(3);<br>A(2) ← C(2);<br>A(1) ← C(1);<br>A(0) ← C(0). |
| COUNTERCLOCKWISE 270° IMAGE ROTATION AFTER IMAGE REVERSAL | A(7) ← not C(3);<br>A(6) ← not C(2);<br>A(5) ← not C(1);<br>A(4) ← not C(0);<br>A(3) ← not C(7);<br>A(2) ← not C(6);<br>A(1) ← not C(5);<br>A(0) ← not C(4). |
| THROUGH | A(7) ← C(7);<br>A(6) ← C(6);<br>A(5) ← C(5);<br>A(4) ← C(4);<br>A(3) ← C(3);<br>A(2) ← C(2);<br>A(1) ← C(1);<br>A(0) ← C(0). |

FIG. 16

| COUNTER OUTPUT VALUE C(7:0)<br>UPPER STAGE: DECIMAL NUMBER NOTATION<br>LOWER STAGE: BINARY NUMBER NOTATION | VALUE AFTER BIT EXCHANGE A(7:0)<br>UPPER STAGE: DECIMAL NUMBER NOTATION<br>LOWER STAGE: BINARY NUMBER NOTATION |
|---|---|
| 0<br>00000000 | 15<br>00001111 |
| 1<br>00000001 | 31<br>00011111 |
| 2<br>00000010 | 47<br>00101111 |
| 3<br>00000011 | 63<br>00111111 |
| 4<br>00000100 | 79<br>01001111 |
| 5<br>00000101 | 95<br>01011111 |
| 6<br>00000110 | 111<br>01101111 |
| 7<br>00000111 | 127<br>01111111 |
| 8<br>00001000 | 143<br>10001111 |
| 9<br>00001001 | 159<br>10011111 |
| 10<br>00001010 | 175<br>10101111 |
| 251<br>11111011 | 176<br>10110000 |
| 252<br>11111100 | 192<br>11000000 |
| 253<br>11111101 | 208<br>11010000 |
| 254<br>11111110 | 224<br>11100000 |
| 255<br>11111111 | 240<br>11110000 |

FIG. 19

| (0,0) | (1,0) | (2,0) | (3,0) | (4,0) | (5,0) | (6,0) | (7,0) | (8,0) | (9,0) |
|-------|-------|-------|-------|-------|-------|-------|-------|-------|-------|
| (0,1) | (1,1) | (2,1) | (3,1) | (4,1) | (5,1) | (6,1) | (7,1) | (8,1) | (9,1) |
| (0,2) | (1,2) | (2,2) | (3,2) | (4,2) | (5,2) | (6,2) | (7,2) | (8,2) | (9,2) |
| (0,3) | (1,3) | (2,3) | (3,3) | (4,3) | (5,3) | (6,3) | (7,3) | (8,3) | (9,3) |
| (0,4) | (1,4) | (2,4) | (3,4) | (4,4) | (5,4) | (6,4) | (7,4) | (8,4) | (9,4) |
| (0,5) | (1,5) | (2,5) | (3,5) | (4,5) | (5,5) | (6,5) | (7,5) | (8,5) | (9,5) |
| (0,6) | (1,6) | (2,6) | (3,6) | (4,6) | (5,6) | (6,6) | (7,6) | (8,6) | (9,6) |
| (0,7) | (1,7) | (2,7) | (3,7) | (4,7) | (5,7) | (6,7) | (7,7) | (8,7) | (9,7) |

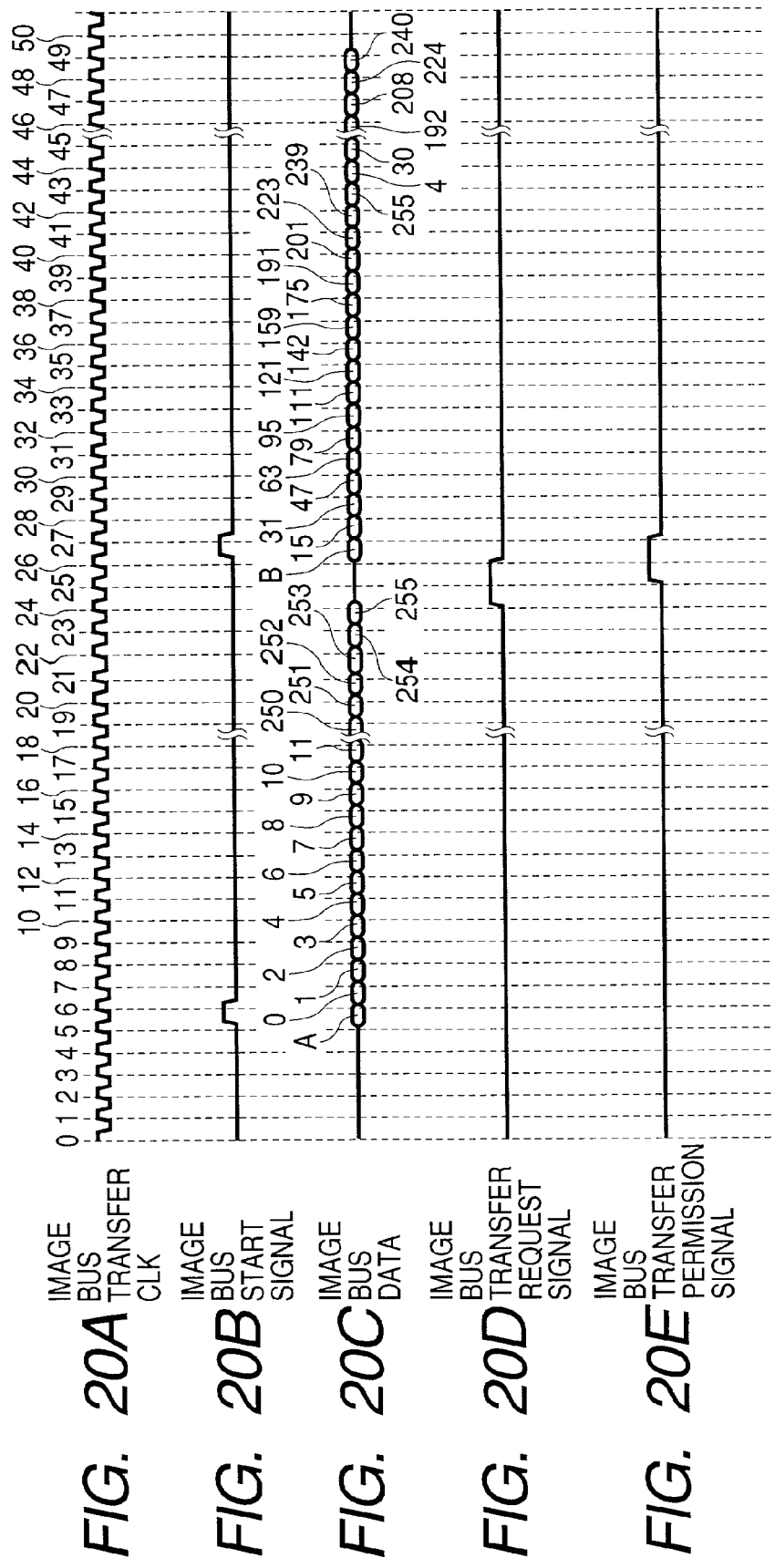

FIG. 21

| IMAGE PROC CONTENTS | TRANSFORMATION<br><br>X',Y': POSITIONAL INFORMATION OUTPUT<br><br>X,Y: POSITIONAL INFORMATION INPUT<br><br>XX: THE NUMBER OF BLOCKS IN HORIZONTAL DIRECTION<br><br>YY: THE NUMBER OF BLOCKS IN VERTICAL DIRECTION | X' STRUCTURE CKT | Y' STRUCTURE CKT |
|---|---|---|---|
| COUNTERCLOCKWISE 90° IMAGE ROTATION | X' ← Y<br>Y' ← XX−1−X | Y ▷ X' | XX / X ▷○▷+ Y' |
| COUNTERCLOCKWISE 180° IMAGE ROTATION | X' ← XX−1−X<br>Y' ← YY−1−Y | XX / X ▷○▷+ X' | YY / Y ▷○▷+ Y' |
| COUNTERCLOCKWISE 270° IMAGE ROTATION | X' ← YY−1−Y<br>Y' ← X | YY / Y ▷○▷+ X' | X ▷ Y' |
| IMAGE REVERSAL | X' ← XX−1−X<br>Y' ← Y | XX / X ▷○▷+ X' | X ▷ Y' |
| COUNTERCLOCKWISE 90° IMAGE ROTATION AFTER IMAGE REVERSAL | X' ← Y<br>Y' ← X | Y ▷ X' | X ▷ Y' |
| COUNTERCLOCKWISE 180° IMAGE ROTATION AFTER IMAGE REVERSAL | X' ← X<br>Y' ← YY−1−Y | X ▷ X' | YY / Y ▷○▷+ Y' |
| COUNTERCLOCKWISE 270° IMAGE ROTATION AFTER IMAGE REVERSAL | X' ← YY−1−Y<br>Y' ← XX−1−X | YY / Y ▷○▷+ X' | XX / X ▷○▷+ Y' |
| THROUGH | X' ← X<br>Y' ← Y | X ▷ X' | Y ▷ Y' |

FIG. 22

| (0,9) | (0,8) | (0,7) | (0,6) | (0,5) | (0,4) | (0,3) | (0,2) | (0,1) | (0,0) |
|---|---|---|---|---|---|---|---|---|---|
| (1,9) | (1,8) | (1,7) | (1,6) | (1,5) | (1,4) | (1,3) | (1,2) | (1,1) | (1,0) |
| (2,9) | (2,8) | (2,7) | (2,6) | (2,5) | (2,4) | (2,3) | (2,2) | (2,1) | (2,0) |
| (3,9) | (3,8) | (3,7) | (3,6) | (3,5) | (3,4) | (3,3) | (3,2) | (3,1) | (3,0) |
| (4,9) | (4,8) | (4,7) | (4,6) | (4,5) | (4,4) | (4,3) | (4,2) | (4,1) | (4,0) |
| (5,9) | (5,8) | (5,7) | (5,6) | (5,5) | (5,4) | (5,3) | (5,2) | (5,1) | (5,0) |
| (6,9) | (6,8) | (6,7) | (6,6) | (6,5) | (6,4) | (6,3) | (6,2) | (6,1) | (6,0) |
| (7,9) | (7,8) | (7,7) | (7,6) | (7,5) | (7,4) | (7,3) | (7,2) | (7,1) | (7,0) |

IMAGE PROCESSING METHOD AND APPARATUS CAPABLE OF ROTATING AND REVERSING AN INPUT IMAGE

BACKGROUND OF THE INVENTION

1. Field of the Invention

The present invention relates to an image processing method which is applied to a fax machine, a copying machine and the like, an image processing apparatus which adopts the above image processing method, and a storage medium which stores a control program to control the above image processing apparatus.

2. Related Background Art

Generally, an image which is managed by a fax machine, a copying machine and the like has determined size and shape. This shape is a rectangle extending longitudinally or laterally.

In the currently spreading small fax machines, there are a lot of types that the image is processed in the longitudinal direction (i.e., a portrait orientation). On the other hand, in the currently spreading heavy fax machines, there are a lot of types that the image is processed in the lateral direction (i.e., a landscape orientation).

Thus, in the heavy fax machines having a fax transmission function, there is a type which performs, even if the original is read in the lateral direction, an image rotation process of 90° or 270° to turn the read image toward the longitudinal direction and then fax transmit the turned image.

Similarly, there is a type which performs the image rotation process of 90° or 270°, when the image data is fax received, to turn the output image toward the direction same as that of the image output when the copying machine is normally used.

Further, there is an image reading apparatus which performs the image rotation process of 90°, 180° or 270° to transmit the image data to a connected apparatus such as an image server or the like to which the direction of the image to be transmitted has been defined, or performs the image rotation process of 90°, 180° or 270° to correspond to a user's demand to orient the output images toward a certain direction.

Further, e.g., in a case where the image is printed on a transparent sheet, there is an apparatus which has an image right-and-left or up-and-down reversal function to be able to perform an image reversal process to print a mirror image. In the mirror image, the image has been right-and-left or up-and-down reversed and printed such that, when the printed image is viewed from the back face of this transparent sheet, it becomes the faithful image.

In order to satisfy the demand of such the image rotation process of 90°, 180° or 270° or the image right-and-left or up-and-down reversal process as above, there is an image processing apparatus which achieves such an image rotation/reversal process. In this image processing apparatus, a dedicated memory array or shift register on which data writing and reading can be performed in both the longitudinal and lateral directions is provided, and the direction of the data writing is made different from the direction of the data reading to achieve the image rotation/reversal process.

However, if the dedicated memory array or shift register is used, dedicated circuits for the image rotation and the image reversal are necessary, whereby a memory circuit is complicated as a whole. Thus, a circuit scale becomes large, and thus the cost for achievement rises. Further, the limit of an operation clock frequency capable of operating at high speed is lowered, and the entire circuit has to be designed as exclusive use, whereby expansion and diversion of the circuit are difficult.

Further, the image rotation/reversal process is performed according to a procedure that pixel data representing the image is once stored in an internal memory and then read therefrom. Further, there has been known a method that the pixel data representing the image is not processed at one time, but the entire image is first divided into blocks each having the small number of composite pixels, and the image rotation/reversal process is performed for each of the small image data blocks.

Then, to achieve the rotation/reversal process for the entire image by rearranging the positions of all the image data blocks to which the rotation/reversal process has been performed pro re nata, a rearrangement process is performed for each block by means of an external circuit or software independent of an image rotation and reversal processing apparatus.

The reason of adopting such a structure, i.e., the reason of not performing the rotation/reversal process for the entire image at one time, is that, since the image managed in the fax machine and the copying machine is obtained by reading an original of A4 or letter size at resolution of 200 dpi (dots per inch) or 600 dpi and therefore the total number of pixels constituting the original image is remarkably large, an unrealistic large memory capacity is necessary when the entire image is stored in the memory array, the shift register or a general-purpose memory at one time to perform the image rotation/reversal process.

However, in the case where the rearrangement process is performed for each block by using the external circuit independently of the image rotation and reversal processing apparatus, or in the case where the rearrangement process is performed for each block by using the software, problems occur in processing speed and a parallel operation because of the following reason. Namely, when the rearrangement process is performed for each block, it is necessary to repeatedly perform the reading and the writing for each block on a page memory capable of storing the entire image plural times corresponding to the number of all the blocks. Thus, by repeatedly performing such the processes for all the blocks, it takes excessive processing time corresponding to the time necessary for reading the entire image and the time necessary for writing the entire image in addition to the time necessary for the image rotation/reversal process.

Further, the unit of the above image rotation/reversal process is the entire image. Even if there is a request of the image rotation/reversal process for plural images, it is impossible to simultaneously perform these processes in parallel, and it is also impossible to interrupt the image process being performed. Thus, in this case, since it only waits until the image process which is being performed ends, a priority process or the like which preferentially processes the image to which the process was requested later can not be performed.

Further, since one image rotation and reversal processing apparatus is allocated to one image without fail, even if the number of the image rotation and reversal processing apparatuses is increased, these image rotation and reversal processing apparatuses can not process the one image in parallel, whereby the process can not be completed at high speed.

SUMMARY OF THE INVENTION

The present invention is to solve the above problems in the conventional art, and a first object of the present invention is to provide image processing method and apparatus which can minimize circuit scale to perform an image rotation/reversal process, increases an operation clock frequency of the entire apparatus to easily enable a high-speed operation, and is excellent in expansion and diversion of the circuit.

A second object of the present invention is to provide a storage medium which stores a control program to control the image processing apparatus achieving the first object of the present invention.

A third object of the present invention is to provide image processing method and apparatus which can shorten a time necessary to perform an image rotation/reversal process, equally achieve a parallel process, and have expansion for high-speed image rotation/reversal process.

A fourth object of the present invention is to provide a storage medium which stores a control program to control the image processing apparatus achieving the third object of the present invention.

In order to achieve the above first object, an image processing method according to the present invention comprises:
- a numerical signal generation step of sequentially generating and outputting regular binary numerical signals in synchronism with a clock signal;
- a bit exchange step of generating and outputting, from the output signal in the numerical signal generation step being managed as an input signal, a signal that order of bits in the input signal has been exchanged or a signal that the bits in the input signal have been reversed; and
- a control step of controlling the bit order exchange operation or the bit reversal operation in the bit exchange step,
- wherein image data divided into pixel data and one-dimensionally arranged and stored in a memory is read and output in synchronism with the sequential operation in the numerical signal generation step, and the output signal generated in the bit exchange step is read and output as an address signal, so that a rotation/reversal process to a former image is performed.

Further, in order to achieve the above first object, an image processing apparatus according to the present invention comprises:
- a numerical signal generation means for sequentially generating and outputting regular binary numerical signals in synchronism with a clock signal;
- a bit exchange means for generating and outputting, from the output signal of the numerical signal generation means being managed as an input signal, a signal that order of bits in the input signal has been exchanged or a signal that the bits in the input signal have been reversed;
- a control means for controlling the bit order exchange operation or the bit reversal operation of the bit exchange means; and
- a storage means for storing image data,
- wherein the image data divided into pixel data and one-dimensionally arranged and stored in the storage means is read and output in synchronism with the sequential operation of the numerical signal generation means, and the output signal generated by the bit exchange means is read and output as an address signal, so that a rotation/reversal process to a former image is performed.

Further, in order to achieve the above first object, an image processing method according to the present invention comprises:
- a numerical signal generation step of sequentially generating and outputting regular binary numerical signals in synchronism with a clock signal;
- a bit exchange step of generating and outputting, from the output signal in the numerical signal generation step being managed as an input signal, a signal that order of bits in the input signal has been exchanged or a signal that the bits in the input signal have been reversed; and
- a control step of controlling the bit order exchange operation or the bit reversal operation in the bit exchange step,
- wherein image data is written in a memory in synchronism with the sequential operation in the numerical signal generation step and by using the output signal generated in the bit exchange step as an address signal, and the image data written in the memory is read according to addresses of predetermined order, so that a rotation/reversal process to a former image is performed.

Further, in order to achieve the above first object, an image processing apparatus according to the present invention comprises:
- a numerical signal generation means for sequentially generating and outputting regular binary numerical signals in synchronism with a clock signal;
- a bit exchange means for generating and outputting, from the output signal of the numerical signal generation means being managed as an input signal, a signal that order of bits in the input signal has been exchanged or a signal that the bits in the input signal have been reversed;
- a control means for controlling the bit order exchange operation or the bit reversal operation of the bit exchange means; and
- a storage means for storing image data,
- wherein the image data is written in the storage means in synchronism with the sequential operation of the numerical signal generation means and by using the output signal generated by the bit exchange means as an address signal, and the image data written in the storage means is read according to addresses of predetermined order, so that a rotation/reversal process to a former image is performed.

Further, in order to achieve the above second object, in a storage medium according to the present invention which stores a control program to control an image processing apparatus, the program comprises:
- a numerical signal generation module of sequentially generating and outputting regular binary numerical signals in synchronism with a clock signal;
- a bit exchange module of generating and outputting, from the output signal in the numerical signal generation module being managed as an input signal, a signal that order of bits in the input signal has been exchanged or a signal that the bits in the input signal have been reversed; and
- a control module of controlling the bit order exchange operation or the bit reversal operation in the bit exchange module,
- wherein image data divided into pixel data and one-dimensionally arranged and stored in a memory is read and output in synchronism with the sequential operation in the numerical signal generation module, and the output signal generated in the bit exchange module is read and output as an address signal, so that a rotation/reversal process to a former image is performed.

Further, in order to achieve the above second object, in a storage medium according to the present invention which stores a control program to control an image processing apparatus, the program comprises:

a numerical signal generation module of sequentially generating and outputting regular binary numerical signals in synchronism with a clock signal;

a bit exchange module of generating and outputting, from the output signal in the numerical signal generation module being managed as an input signal, a signal that order of bits in the input signal has been exchanged or a signal that the bits in the input signal have been reversed; and a control module of controlling the bit order exchange operation or the bit reversal operation in the bit exchange module, wherein image data is written in a memory in synchronism with the sequential operation in the numerical signal generation module and by using the output signal generated in the bit exchange module as an address signal, and the image data written in the memory is read according to addresses of predetermined order, so that a rotation/reversal process to a former image is performed.

Further, in order to achieve the above third object, an image processing method according to the present invention comprising:

an input step of inputting a block image and positional information of the block image;

an image rotation/reversal processing step of rotating or reversing the input block image by a block, and outputting the rotated or reversed block image; and a conversion step of converting the positional information of the input block image into the positional information of the image after the rotation or the reversal, wherein the conversion in the conversion step is a process corresponding to the content of the image rotation or the image reversal in the image rotation/reversal processing step, and in the conversion, the positional information for the entire image before the rotation or the reversal where the block image stands is converted into the positional information for the entire image after the image rotation or the image reversal in the image rotation/reversal processing step, and the converted positional information is added to the rotated or reversed block image and output.

Further, in order to achieve the above third object, an image processing apparatus according to the present invention comprising:

an input means for inputting a block image and positional information of the block image;

an image rotation/reversal processing means for rotating or reversing the input block image by a block, and outputting the rotated or reversed block image; and a conversion means for converting the positional information of the input block image into the positional information of the image after the rotation or the reversal, wherein the conversion by the conversion means is a process corresponding to the content of the image rotation or the image reversal by the image rotation/reversal processing means, and in the conversion, the positional information for the entire image before the rotation or the reversal where the block image stands is converted into the positional information for the entire image after the image rotation or the image reversal by the image rotation/reversal processing means, and the converted positional information is added to the rotated or reversed block image and output.

Further, in order to achieve the above fourth object, in a storage medium according to the present invention which stores a control program to control an image processing apparatus, the control program comprises:

an input module of inputting a block image and positional information of the block image;

an image rotation/reversal processing module of rotating or reversing the input block image by a block, and outputting the rotated or reversed block image; and a conversion module of converting the positional information of the input block image into the positional information of the image after the rotation or the reversal, wherein the conversion in the conversion module is a process corresponding to the content of the image rotation or the image reversal in the image rotation/reversal processing module, and in the conversion, the positional information for the entire image before the rotation or the reversal where the block image stands is converted into the positional information for the entire image after the image rotation or the image reversal in the image rotation/reversal processing module, and the converted positional information is added to the rotated or reversed block image and output.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram showing a case where image data is divided into pixel data, in the image processing apparatus according to the embodiment of the present invention;

FIG. 8 is a diagram showing a case where the image data is rotated counterclockwise by 90°, in the image processing apparatus according to the embodiment of the present invention;

FIG. 9 is a diagram showing a case where the image data is rotated counterclockwise by 180°, in the image processing apparatus according to the embodiment of the present invention;

FIG. 10 is a diagram showing a case where the image data is rotated counterclockwise by 270°, in the image processing apparatus according to the embodiment of the present invention;

FIG. 11 is a diagram showing a case where the image data is right-and-left reversed, in the image processing apparatus according to the embodiment of the present invention;

FIG. 12 is a diagram showing a case where the image data is right-and-left reversed and then rotated counterclockwise by 90°, in the image processing apparatus according to the embodiment of the present invention;

FIG. 13 is a diagram showing a case where the image data is right-and-left reversed and then rotated counterclockwise by 180°, in the image processing apparatus according to the embodiment of the present invention;

FIG. 14 is a diagram showing a case where the image data is right-and-left reversed and then rotated counterclockwise by 270°, in the image processing apparatus according to the embodiment of the present invention;

FIG. 15 is a list of bit exchange contents for types of image rotation/reversal process in the image processing apparatus according to the embodiment of the present invention;

FIG. 16 is a bit exchange table for achieving address control to rotate the image data counterclockwise by 90°, in the image processing apparatus according to the embodiment of the present invention;

FIG. 19 is a diagram showing a case where an image is divided and managed as plural images in the image processing apparatus according to the second embodiment of the present invention;

FIGS. 20A, 20B, 20C, 20D and 20E is signal timing charts in a case where block data is transferred through an image bus in the image processing apparatus according to the second embodiment of the present invention;

FIG. 21 is a block position information conversion method list for types of image rotation/reversal process in the image processing apparatus according to the second embodiment of the present invention; and FIG. 22 is a diagram showing a case where the images divided into 10 blocks in a horizontal direction and eight blocks in a vertical direction shown in FIG. 19 are rotated counterclockwise by 90°.

DETAILED DESCRIPTION OF THE PREFERRED EMBODIMENTS

The preferred embodiments of the present invention will now be described in detail in accordance with the accompanying drawings.

First Embodiment

Figure 1:
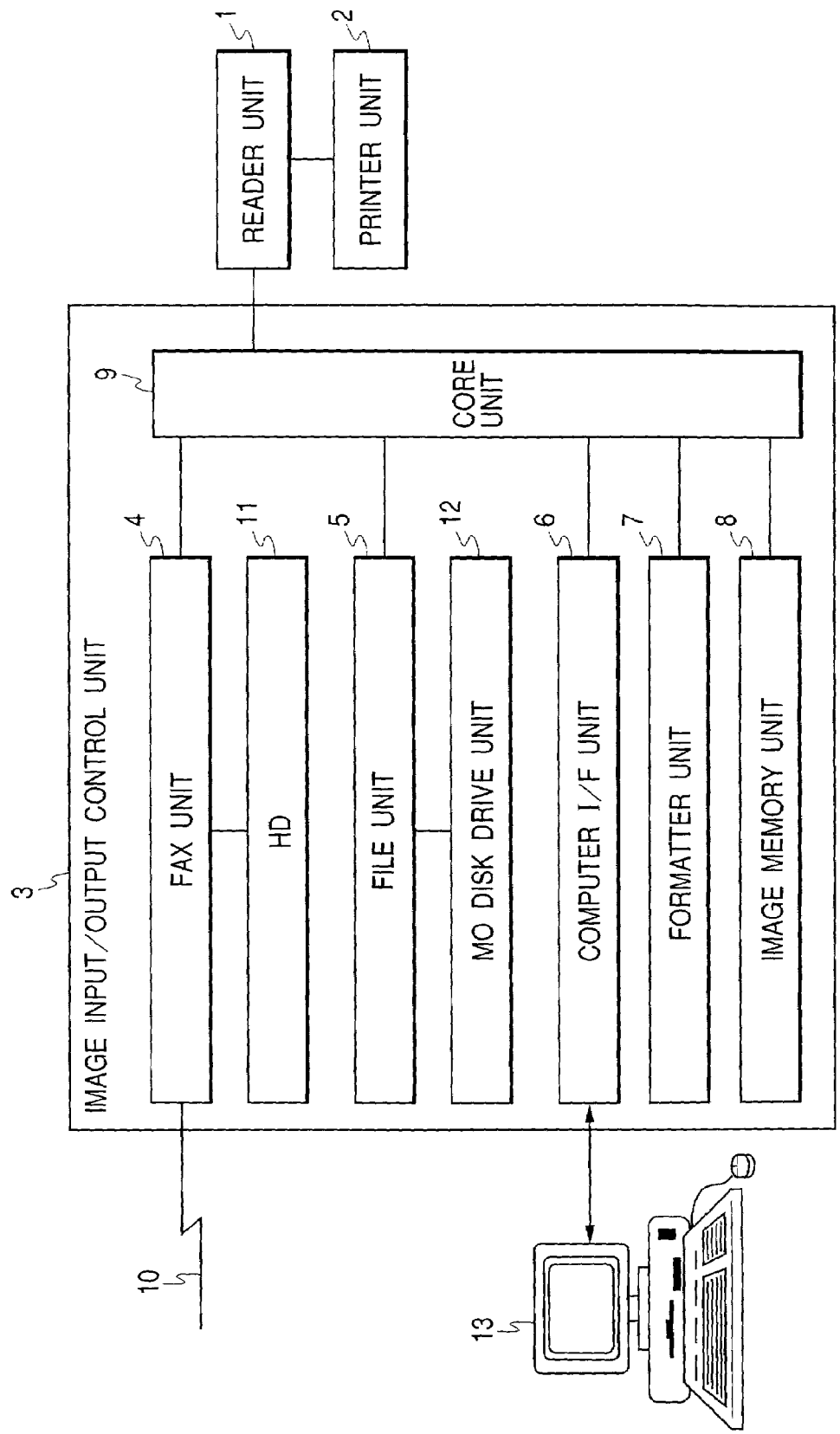
FIG. 1 is a block diagram showing a system structure of an image processing apparatus according to the embodiment of the present invention.

FIG. 1 is a block diagram showing a system structure of an image processing apparatus according to the present embodiment. In FIG. 1, numeral 1 denotes a reader unit which reads an image on an original and then outputs image data corresponding to the read original image to a printer unit 2 and an image input/output control unit 3. Numeral 2 denotes the printer unit 2 which forms on a recording sheet an image corresponding to the image data input from the reader unit 1 and the image input/output control unit 3. Numeral 3 denotes the image input/output control unit which is connected to the reader unit 1 is composed of a fax unit 4, a file unit 5, a computer I/F (interface) unit 6, a formatter unit 7, an image memory unit 8, a core unit 9 and the like.

The fax unit 4 expands compressed image data received through a telephone line 10, and transfers the expanded image data to the core unit 9. Further, the fax unit 4 compresses image data transferred from the core unit 9, and transmits the compressed image data through the telephone line 10. An HD (hard disk) 11 is connected to the fax unit 4, whereby the compressed image data received can be temporarily stored in the HD 11.

An MO (magnetooptical) disk drive unit 12 is connected to the file unit 5. Thus, the file unit 5 compresses image data transferred from the core unit 9, and stores the compressed image data in an MO disk set in the MO disk drive unit 12, together with a keyword used to retrieve such the compressed image data. The file unit 5 retrieves the compressed image data stored in the MO disk on the basis of the keyword transferred through the core unit 9, reads the retrieved image data, expands the read image data, and then transfers the expanded image data to the core unit 9.

The computer I/F unit 6 interfaces a PC/WS (personal computer or working station) 13 with the core unit 9.

The formatter unit 7 inputs code data representing an image transferred from the PC/WS 13, and expands the input code data to obtain the image data capable of being recorded by the printer unit 2.

The image memory unit 8 temporarily stores the data transferred from the PC/WS 13.

The core unit 9 controls the data flow among the reader unit 1, the fax unit 4, the file unit 5, the computer I/F unit 6, the formatter unit 7 and the image memory unit 8.

Figure 2:
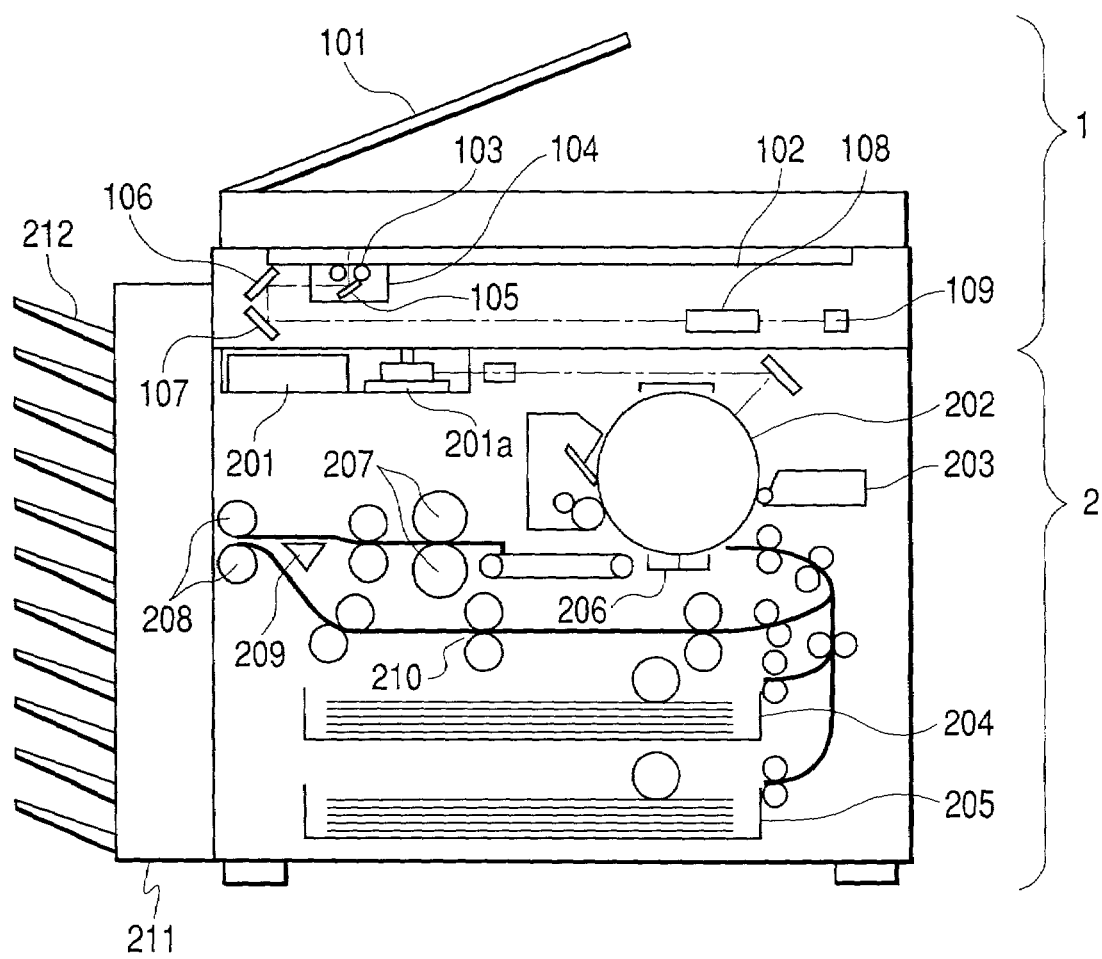
FIG. 2 is a vertical sectional view showing structures of a reader unit and a printer unit in the image processing apparatus according to the embodiment of the present invention.

FIG. 2 is a vertical sectional view showing structures of the reader unit 1 and the printer unit 2. In FIG. 2, an original feeder 101 of the reader unit 1 feeds one by one the original from its last page in due order to a platen glass 102. After an original reading operation ended, the original feeder 101 discharges the original from the platen glass 102.

When the original is transported onto the platen glass 102, a lamp 103 is lit, and movement of a scanner unit 104 is started, whereby the original is exposed and scanned. At this time, reflection light from the original is guided into a CCD (charge-coupled device) image sensor (simply called a CCD hereinafter) 109 by means of mirrors 105, 106 and 107 and a lens 108. An image of the original scanned as above is read by the CCD 109. Image data output from the CCD 109 is subjected to a predetermined process, and then transferred to the printer unit 2 and the core unit 9 of the image input/output control unit 3.

A laser driver 201 of the printer unit 2 drives a laser beam generator 201a to generate a laser beam in response to the image data output from the reader unit 1. The generated laser beam is irradiated on a photosensitive drum 202, whereby a latent image corresponding to the irradiated laser beam is formed on the photosensitive drum 202. Then, a development agent is adhered by a development unit 203 to the part corresponding to the latent image on the photosensitive drum 202. At timing synchronous with a start of the laser beam irradiation, a recording sheet is fed from either an upper sheet feed cassette 204 or a lower sheet feed cassette 205 to a transfer unit 206, and the development agent on the photosensitive drum 202 is transferred to the fed recording sheet. The recording sheet to which the development agent has been transferred is then transported to a fixing unit 207, and thus the development agent is fixed to the recording sheet by heat and pressure of the fixing unit 207. The recording sheet passed the fixing unit 207 is discharged by discharge rollers 208. Then, a sorter 211 holds the discharged sheets to respective bins 212 to sort the recording sheets.

When a sorting mode is not set, the sorter 211 holds all the discharged recording sheets to the uppermost bin 212. Further, when a two-faced recording mode is set, the recording sheet is transported to the discharge rollers 208, and then the rotation direction of the roller 208 is reversed, whereby the transported sheet is guided to a sheet refeed path 210 by a flapper 209. Further, when a multirecording mode is set, the recording sheet is not transported to the sheet discharge rollers 208 but guided to the sheet refeed path 210 by the flapper 209. The recording sheet guided to the sheet refeed path 210 is then transported to the transfer unit 206 at the above timing.

Figure 3:
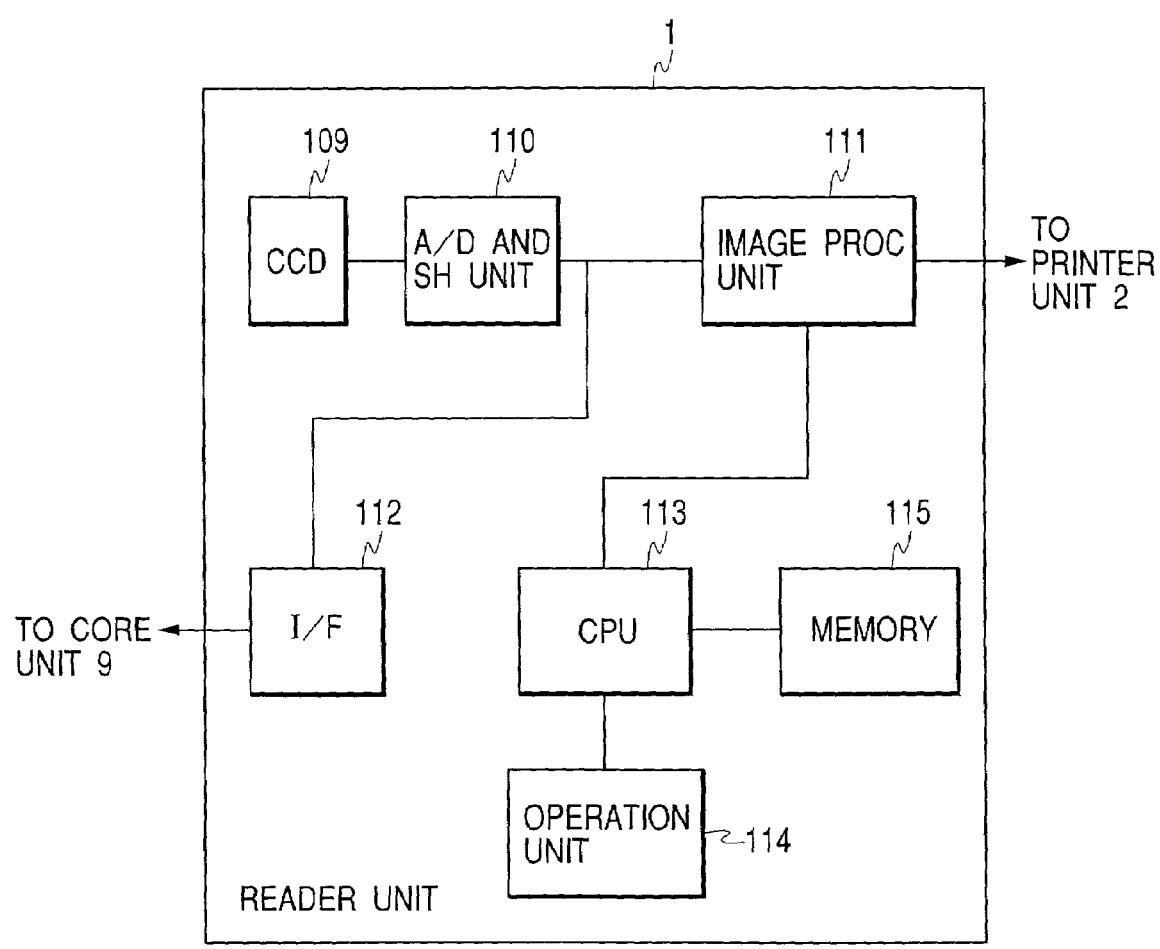
FIG. 3 is a block diagram showing an internal structure of the reader unit in the image processing apparatus according to the embodiment of the present invention.

FIG. 3 is a block diagram showing an internal structure of the reader unit 1. In FIG. 3, numeral 109 denotes a CCD, numeral 110 denotes an A/D and SH (analog-to-digital conversion and shading correction) unit, numeral 111 denotes an image processing unit, numeral 112 denotes an I/F, numeral 113 denotes a CPU (central processing unit), numeral 114 denotes an operation unit, and numeral 115 denotes a memory.

In FIG. 3, the image data output from the CCD 109 is subjected to an A/D conversion process and a shading correction process by the A/D and SH unit 110. The image data processed by the A/D and SH unit 110 is transferred to the printer unit 2 through the image processing unit 111, and also transferred to the core unit 9 of the image input/output control unit 3 through the I/F 112.

The CPU 113 controls the image processing unit 111 and the I/F 112 according to setting contents set on the operation unit 114. For example, when a copying mode to perform a trimming process and then perform an copying operation is set on the operation unit 114, the CPU 113 causes the image processing unit 111 to perform the trimming process and then transfer the processed data to the printer unit 2. Further, when a fax transmission mode is set on the operation unit 114, the CPU 113 causes the I/F 112 to transfer the image data and a control command according to the set mode to the core unit 9.

A control program for the CPU 113 has been stored in the memory 115, whereby the CPU 113 performs the control with reference to the control program in the memory 115. Further, the memory 115 is used as a working area of the CPU 113.

Figure 4:
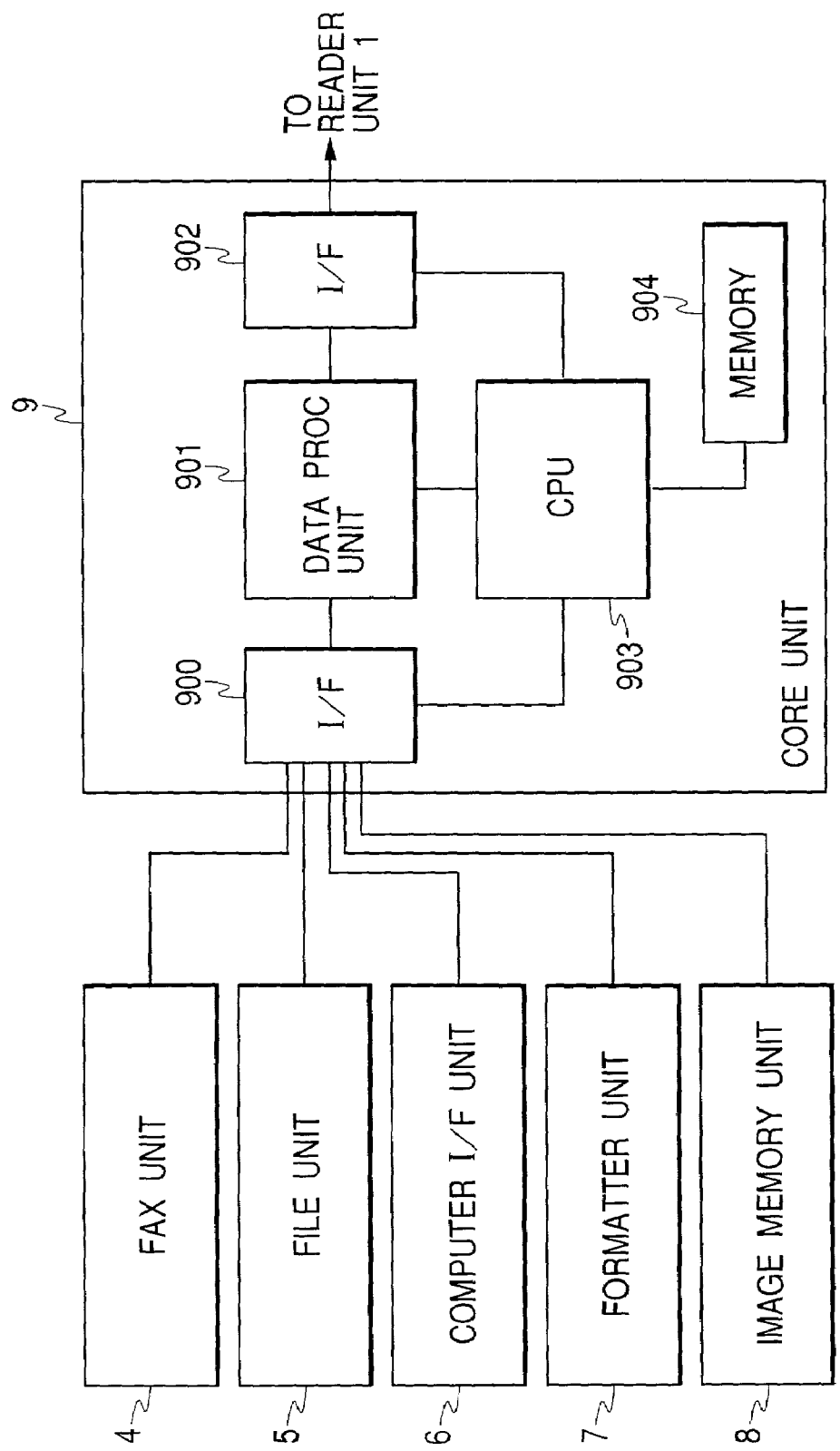
FIG. 4 is a block diagram showing an internal structure of a core unit in the image processing apparatus according to the embodiment of the present invention.

FIG. 4 is a block diagram showing an internal structure of the core unit 9. In FIG. 4, numeral 900 denotes an I/F, numeral 901 denotes a data processing unit, numeral 902 denotes an I/F, numeral 903 denotes a CPU, and numeral 904 denotes a memory.

In FIG. 4, the image data from the reader unit 1 is transferred to the data processing unit 901, and a control command from the reader unit 1 is transferred to the CPU 903. The data processing unit 901 performs various image processes such as an image rotation process, a magnification change process and the like. The image data transferred from the reader unit 1 to the data processing unit 901 is then transferred to the fax unit 4, the file unit 5 and the computer I/F unit 6 through the I/F 900, in response to the control command transferred from the reader unit 1. Further, code data representing an image input through the computer I/F unit 6 is once transferred to the data processing unit 901, and then transferred to the formatter unit 7 to be expanded into image data. The expanded image data is transferred to the data processing unit 901, and then transferred to the fax unit 4 and the printer unit 2.

Image data from the fax unit 4 is once transferred to the data processing unit 901, and then transferred to the print unit 2, the file unit 5 and the computer I/F unit 6.

The CPU 903 performs such the control as described above in accordance with the control program stored in the memory 904 and the control command transferred from the reader unit 1. Further, the memory 904 is used as a working area of the CPU 903. Thus, a process in which the functions of original image reading, image printing, image transmission/reception, image storing, data input/output from/to the PC/WS 13 and the like are composited to others can be performed mainly in the core unit 9.

Figure 5:
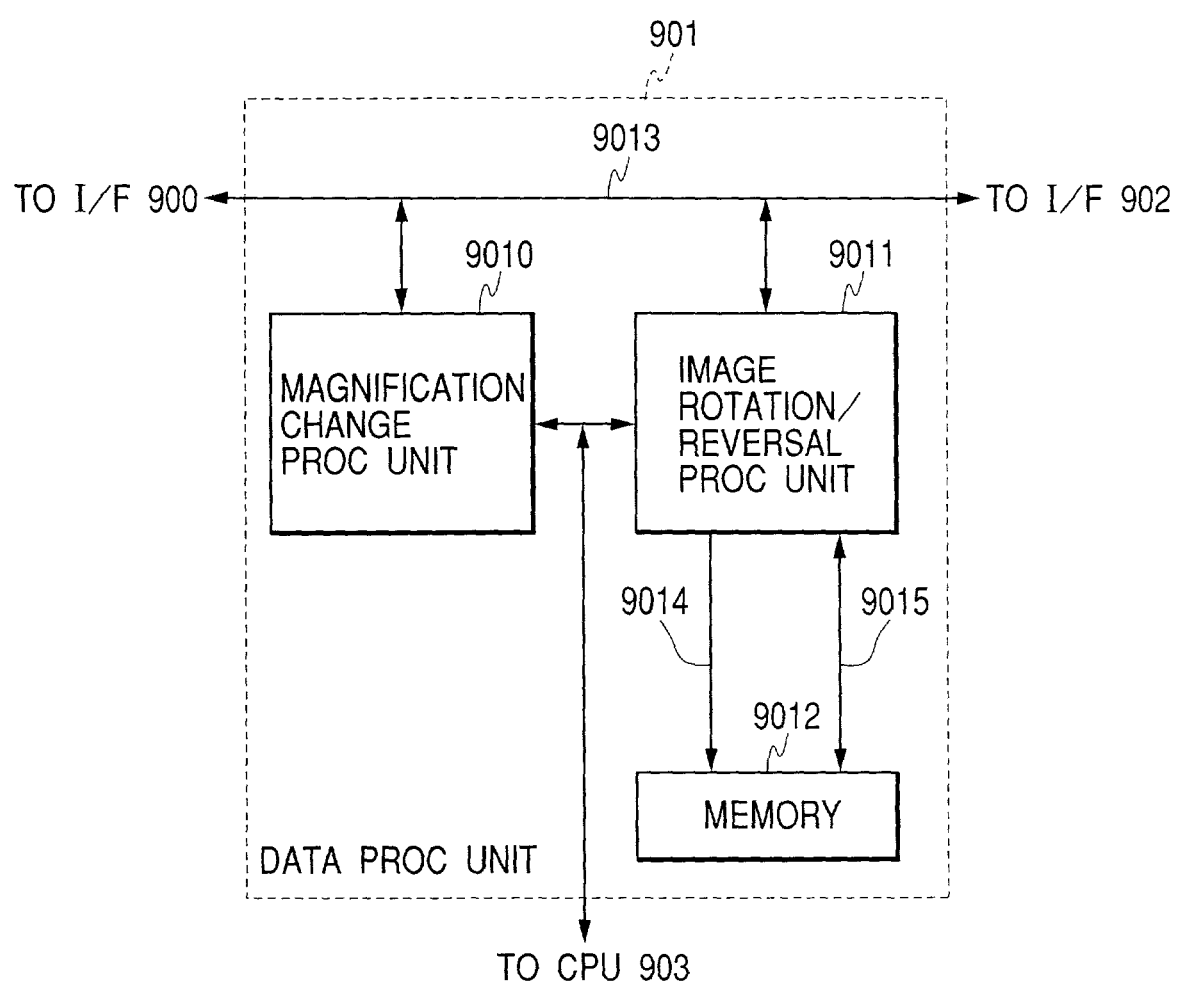
FIG. 5 is a block diagram showing an internal structure of a data processing unit in the image processing apparatus according to the embodiment of the present invention.

FIG. 5 is a block diagram showing an internal structure of the data processing unit 901. In FIG. 5, numeral 9010 denotes a magnification change processing unit, numeral 9011 denotes an image rotation/reversal processing unit, numeral 9012 denotes a memory, numeral 9013 denotes an image bus, numeral 9014 denotes an address bus, and numeral 9015 denotes a data bus.

In FIG. 5, the image data from the reader unit 1 is transferred to the data processing unit 901 through the I/F 902. Further, the image data from the fax unit 4, the file unit 5, the formatter unit 7 and the image memory unit 8 is transferred to the data processing unit 901 through the I/F 900.

The image bus 9013 is a shared transmission path. The image data is transferred to the magnification change processing unit 9010 when the magnification change process is performed under the control of the CPU 903, while the image data is transferred to the image rotation/reversal processing unit 9011 when an image rotation/reversal process is performed under the control of the CPU 903. Then, the magnification change process is performed by the magnification change processing unit 9010, and the image rotation/reversal process is performed by the image rotation/reversal processing unit 9011. The memory 9012 is connected to the image rotation/reversal processing unit 9011, whereby the image data is temporarily stored in the memory 9012 while the image rotation/reversal process is being performed.

Figure 6:
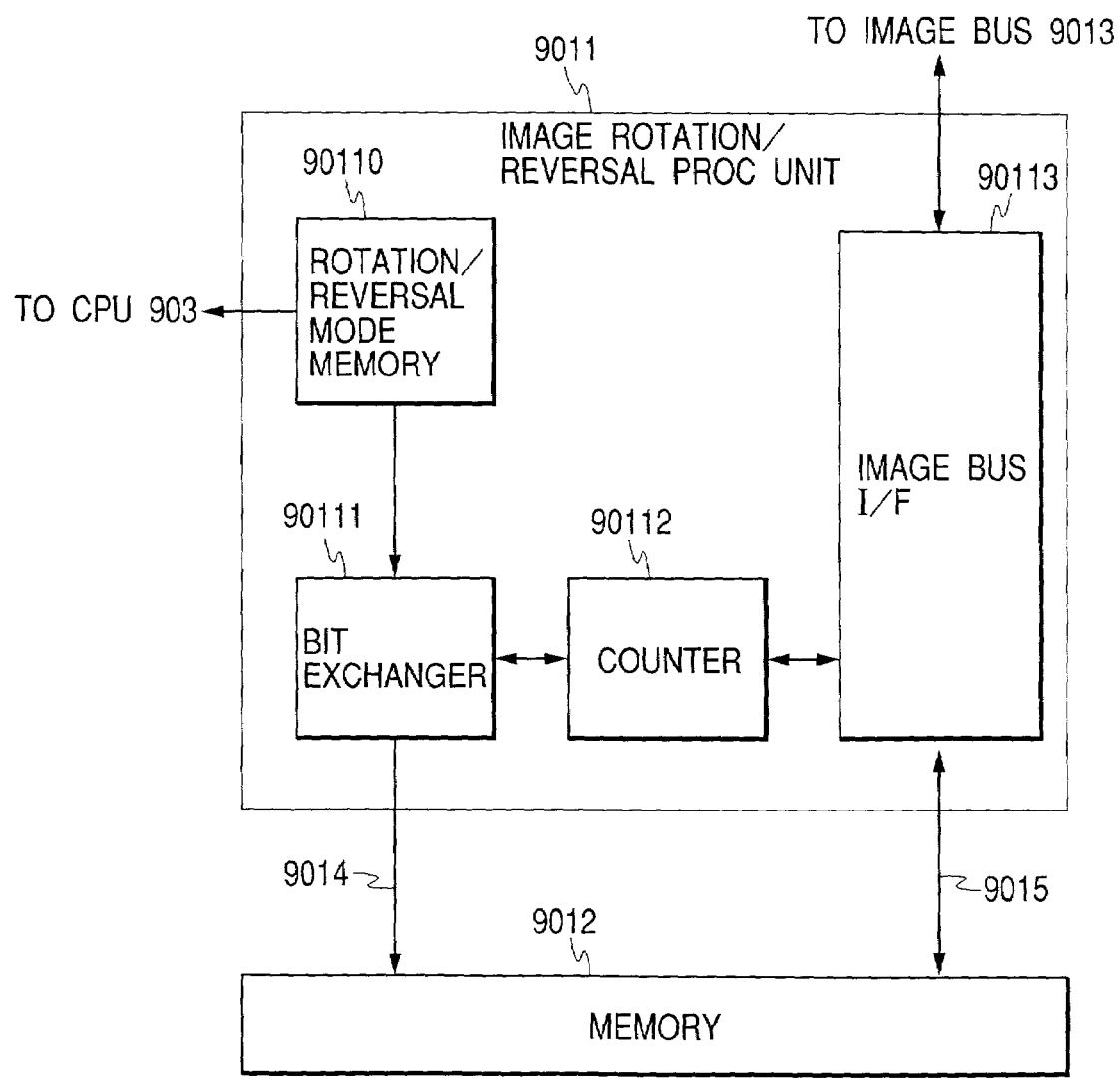
FIG. 6 is a block diagram showing an internal structure of an image rotation/reversal processing unit in the image processing apparatus according to the embodiment of the present invention.

FIG. 6 is a block diagram showing an internal structure of the image rotation/reversal processing unit 9011. In FIG. 6, numeral 90110 denotes a rotation/reversal mode memory, numeral 90111 denotes a bit exchanger, numeral 90112 denotes a counter, and numeral 90113 denotes an image bus I/F.

In FIG. 6, image data from the image bus 9013 is transferred to the data bus 9015 through the image bus I/F 90113. The counter 90112 outputs ascending-order binary numbers, and the output of this counter 90112 is output to the address bus 9014 through the bit exchanger 90111 to control writing and reading addresses of the memory 9012. It should be noted that the counter 90112 sequentially generates and outputs regular binary numerical signals in synchronism with a certain clock signal. The bit exchanger 90111 is the bit arrangement changer which changes the order of input bit data and outputs the data in the changed order. The bit exchanger 90111 which has a function to rearrange the input bit data for each bit and a function to perform bit reversal of the value of each bit data is controlled by the rotation/reversal mode memory 90110. The rotation/reversal mode memory 90110 consists of a register of which the contents can be rewritten and read by the CPU 903, and acts as the part to determine the operation of the image rotation/reversal processing unit 9011.

Hereinafter, a procedure to perform the image rotation/reversal process in the data processing unit 901 will be explained.

When the image rotation/reversal process is performed, the image data stored in the image memory unit 8 is transferred to the image rotation/reversal processing unit 9011 through the I/F 900 and the image bus 9013 under the control of the CPU 903. At this time, the image data is transferred and input to the image rotation/reversal processing unit 9011 for each pixel in synchronism with a transfer clock of the image bus 9013. Then, the image rotation/reversal processing unit 9011 stores the received image data in the memory 9012. In this case, a general-purpose memory controllable through the address bus 9014 and the data bus 9015 is used as the memory 9012.

After the image data of which the defined size had been previously set by the CPU 903 was received, the image rotation/reversal processing unit 9011 starts to read the image data from the memory 9012 for each pixel. Here, order of reading pixel data by controlling the address bus 9014 to the memory 9012 has been changed from order of writing the pixel data. The image rotation/reversal process is achieved by such the control. For example, if the image data are sequentially read in the order opposite to that in case of the data writing, the image which has been rotated by 180° can be obtained. On the other hand, if the image data are sequentially read in the order same as that in case of the data writing, the image which has been rotated by 0° (i.e., an unrotated and unreversed image) can be obtained. The details of this operation will be described later.

The read image data is transferred to output destinations such as the fax unit 4, the file unit 5, the image memory unit 8 and the like through the image bus 9013 and the I/F 900.

FIG. 7 is a diagram showing a case where all pixels of image data of 16-pixel square are added respectively with unique numbers. In FIG. 7, it is assumed that each of small squares corresponds to each pixel constituting the image data of 16-pixel square, and the image data of one pixel is eight-bit data.

Hereinafter, a case where such a pixel block of 16-pixel square is rotated will be explained.

Here, the rule of the order of the pixels in the case where the image transferred from the image bus 9013 is divided into the plural pixels and then the divided pixel is transferred one by one is assumed as follows. In the pixels which are not yet transferred, the leftmost pixel in the uppermost pixel group is first transferred. Namely, the pixels are sequentially transferred in the numerical order shown in FIG. 7. Therefore, the pixel data are sequentially input to the image rotation/reversal processing unit 9011 in the numerical order shown in FIG. 7, while the pixel data are sequentially output from the image rotation/reversal processing unit 9011 in the numerical order shown in FIG. 7. Namely, in the image processing apparatus according to the embodiment of the present invention, since the image is transferred pixel by pixel in synchronism with a clock in the unit of pixel data, the image is managed as a one-dimensional pixel data string along a time axis when the image is transferred onto the image bus. Further, when the image is stored in the unit of pixel in a memory having a one-dimensional address space, this image is managed as a one-dimensional pixel data string along an address axis. Therefore, the image data shown in FIG. 7 is managed as the one-dimensional pixel data string, whereby the pixels in this string are transferred one by one in synchronism with the clock in the order of "0", "1", "2", "3", "4", "5", . . . , "254" and "255". Similarly, when the image data shown in FIG. 7 is stored in the memory, the pixels are sequentially stored one by one in correspondence with the respective addresses in the order of "0", "1", "2", "3", "4", "5", . . . , "254" and "255". It should be noted that such a technique of representing the two-dimensional image data as the one-dimensional pixel data string is generalized, and this technology is convenient in a notation. Thus, hereinafter, the one-dimensional pixel data string in the data transfer operation will be conveniently shown by using such the drawing as in FIG. 7 numerically representing the two-dimensional image. Similarly, the one-dimensional pixel data string in the data storage operation will be conveniently shown by using such the drawing as in FIG. 7 numerically representing the two-dimensional image. As described above, the order of one-dimensional pixel string at this time is assumed to be the numerical order shown in FIG. 7, i.e., the order of "0", "1", "2", "3", "4", "5", . . . , "254" and "255". In any event, the following explanations will be performed on the premise that also the one-dimensional image data string is shown with the drawing numerically representing the two-dimensional image.

The image rotation/reversal processing unit 9011 has two operation steps, i.e., an image data input step and an image data output step. In the image data input step, as described above, the image data for each pixel is input to the image rotation/reversal processing unit 9011 through the image bus 9013. Further, in the image data output step, as described above, the image data is output from the image rotation/reversal processing unit 9011 through the image bus 9013.

These two operation steps will be explained hereinafter with reference to FIG. 6 being the block diagram showing the structure of the image rotation/reversal processing unit 9011.

In the image data input step, the image rotation/reversal processing unit 9011 writes the pixel data sequentially input in the order shown in FIG. 7 in the memory 9012. At this time, the address of the pixel number shown in FIG. 7 is used as the writing address such that the writing address becomes unique with respect to each pixel data. Concretely, a bit exchange in the bit exchanger 90111 is set to be through, and the output completely same as the output of the counter 90112 is transferred to the address bus 9014, whereby the pixel data is written in the memory 9012. After the transfer of all the pixel data ended and the writing of all the pixel data in the memory 9012 ended, the operation step of the image rotation/reversal processing unit 9011 is changed to the image data output step.

In the image data output step, the image rotation/reversal processing unit 9011 sequentially reads the image data stored in the memory 9012, and transfers the read data for each pixel through the image bus 9013. In this case, the reading order of the data from the memory 9012 and the transferring order of the data to the image bus 9013 are controlled as follows according to a kind of rotation process performed to the image data and whether or not the reversal process is performed.

When the image rotation process of 90° counterclockwise is performed, the data is read in the order indicated by a pixel block of 16-pixel square shown in FIG. 8, i.e., the order of "15", "31", . . . , "47", "63", "79", "95", "111", "127", "143", "159", "175", "191", "207", "223", "239", "255", "14", "30", "46", . . . , "208", "224" and "240".

Similarly, when the image rotation process of 180° counterclockwise is performed, the data is read in the order indicated by a pixel block of 16-pixel square shown in FIG. 9. When the image rotation process of 270° counterclockwise is performed, the data is read in the order indicated by a pixel block of 16-pixel square shown in FIG. 10. Further, when the image reversal process is performed, the data is read in the order indicated by a pixel block of 16-pixel square shown in FIG. 11. Further, when the image rotation process of 90° counterclockwise is performed after the image reversal process was performed, the data is read in the order indicated by a pixel block of 16-pixel square shown in FIG. 12. Similarly, when the image rotation process of 180° counterclockwise is performed after the image reversal process was performed, the data is read in the order indicated by a pixel block of 16-pixel square shown in FIG. 13. When the image rotation process of 270° counterclockwise is performed after the image reversal process was performed, the data is read in the order indicated by a pixel block of 16-pixel square shown in FIG. 14.

The feature of the present embodiment is to be able to easily generate the address signal representing the above reading order by converting the bit positions of the signal from the counter 90112.

Concretely, the bit exchange is controlled by the bit exchanger 90111 according to a list shown in FIG. 15. Thus, the address of the corresponding order is output to the address bus 9014, the pixel data is read from the memory 9012 in the desired order, and the read data is transferred to the image bus 9013 through the image bus I/F 90113.

In FIG. 15, symbol C(i) denotes i-th bit of the output signal from the counter 90112 (i.e., the input signal to the bit exchanger 90111), and symbol A(i) denotes i-th bit of the output signal from the bit exchanger 90111 (i.e., the input signal to the counter 90112). A representation "A(i)←C(i)" indicates that the input signal C(i) is selected and output as the output signal A(i), and a representation "A(i)←not C(i)" indicates that the signal obtained by bit-reversing the input signal C(i) is selected and output as the output signal A(i).

Next, an operation example of the bit exchanger 90111 will be explained. FIG. 16 shows the bit exchange contents in the bit exchanger 90111 to achieve the address generation in the above order for performing the image rotation process of 90° counterclockwise. In FIG. 16, the values in the right column are the output values of the bit exchanger 90111 corresponding to the respective counter values in the left column. As described above, the counter 90112 outputs the ascending-order binary numbers increased one by one in synchronism with the clock, and the obtained value is input to the bit exchanger 90111. Then, the bit exchanger 90111 exchanges each bit of the input value according to the predetermined bit exchange content, and outputs the exchanged bit. In case of performing the image rotation process of 90° counterclockwise, as described above, in the bit exchange contents, the upper four bits of the input eight-bit value are bit-reversed and set to the lower four bits of the output value, and the lower four bits of the input eight-bit value are bit-reversed and set to the upper four bits of the output value. By such the bit exchange, as shown in FIG. 16, the value "15" (i.e., the binary "00001111") is output for the counter value "0" (i.e., the binary "00000000") from the bit exchanger 90111, the value "31" (i.e., the binary "00011111") is output for the counter value "1" (i.e., the binary "00000001"), and the value "47" (i.e., the binary "00101111") is output for the counter value "2" (i.e., the binary "00000010"). As a result, with respect to the ascending-order counter values counted up from "0" to "255" in synchronism with the clock, the desired address string of "15", "31", "47", "63", . . . , "224" and "240" synchronous with the clock is generated. Then, by sequentially reading the pixel data from the memory 9012 in synchronism with this address string, the image rotation of 90° counterclockwise can be performed.

Figure 17:
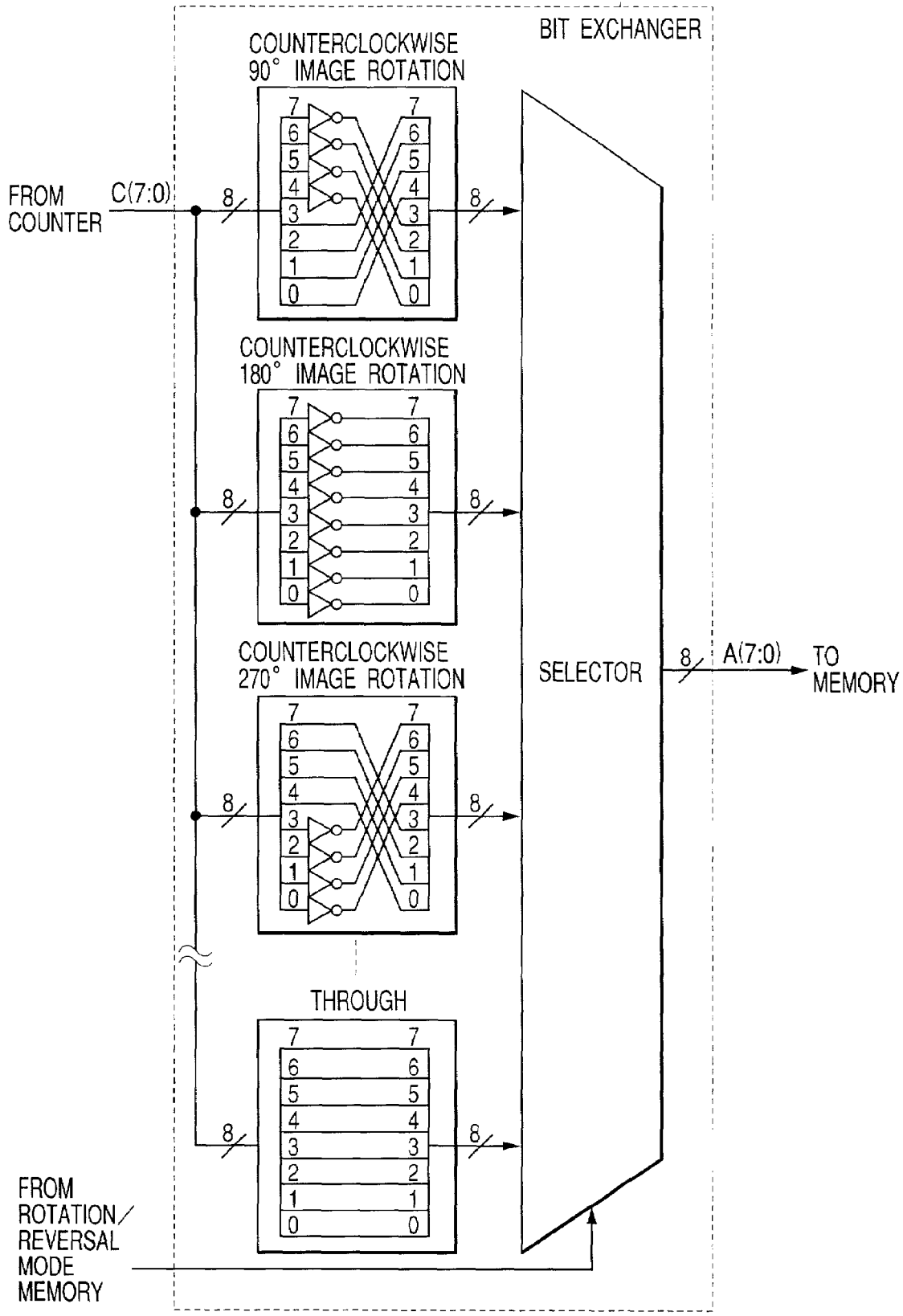
FIG. 17 is a diagram showing a bit exchanger in the image processing apparatus according to the embodiment of the present invention.

Next, an internal structure of the bit exchanger 90111 will be explained. FIG. 17 is a diagram showing the bit exchanger 90111. In the bit exchanger 90111, the eight-bit value input from the counter 90112 is further input to eight bit exchange units respectively. The eight bit exchange units perform bit exchange processes respectively corresponding to eight kinds of image conversion processes such as the image rotation of 90° counterclockwise, the image rotation of 180° counterclockwise, the image rotation of 270° counterclockwise, the image reversal (not shown), the image rotation of 90° counterclockwise after the image reversal (not shown), the image rotation of 180° counterclockwise after the image reversal (not shown), the image rotation of 270° counterclockwise after the image reversal (not shown), and the through process. It should be noted that the not-shown bit exchange unit can be easily designed on the basis of the bit exchange contents of FIG. 15. The output from each bit exchange unit is input to the selector. Then, the output signal of the bit exchange unit achieving the desired image rotation and reversal process is selected and output as the address input signal of the memory 9012, in response to the control signal from the rotation/reversal mode memory 90110.

The above rotation/reversal process was explained for one block of 16×16 pixels. However, if the above process is performed to all of the plural blocks, the rotation/reversal process of the entire image can be performed. Such an operation will be explained in detail in the second embodiment.

As described above, in the system that the two-dimensional image is represented by the aggregate of the pixel data and all the pixel data are one-dimensionally arranged and transferred in synchronism with the clock signal, the image processing apparatus according to the first embodiment includes the counter 90112 for sequentially generating and outputting regular binary numerical signals in synchronism with a clock signal, the bit exchanger 90111 for generating and outputting, from the output signal by the counter 90112 being managed as the input signal, the signal that order of bits in the input signal has been exchanged or the signal that the bits in the input signal have been reversed, and the memory 9012 that the reading/writing can be performed for only the area designated under the control of the address input signal being the output signal from the bit exchanger 90111. Thus, since the image rotation/reversal process can be achieved by combining the general-purpose counter 90112, the general-purpose memory 9012 and the simple bit exchanger 90111 and operating such the combination, the circuit size can be minimized as much as possible. Further, since the general-purpose circuits and the simple circuits are combined, an operation clock frequency of the apparatus can be easily increased as a whole to achieve the high-speed operation. Further, since the simple structure that it is unnecessary to modify or change the circuits in the parts other than the memory even if the number of bits representing the pixel being the minimum unit of the image increases is adopted, circuit's extendibility and diversion are excellent.

In the first embodiment, it was explained the example that the pixel data are stored in the memory 9012 according to the addresses of the predetermined order, and the addresses exchanged by the bit exchanger 90111 are used as the reading addresses from the memory 9012, whereby the image rotation or the image reversal is performed. Conversely, even if the pixel data are stored in the memory 9012 according to the addresses exchanged by the bit exchanger 90111 and the addresses of the predetermined order are used as the reading addresses from the memory 9012, the image rotation or the image reversal can be also performed.

Second Embodiment

In the first embodiment, the rotation or the reversal of the one-block image was explained in detail. In the second embodiment, it will be explained in detail a case where, when an image of one screen including plural blocks is rotated or reversed, positional information before and after the rotation or the reversal of each of the plural blocks is considered.

In the present embodiment, the positional information for the entire image added to the block image before the process is converted into the positional information for the entire image after the process, and the converted positional information is added to the data of the rotated or reversed block and then output. The data to which the positional information was added is once stored in the image memory unit 8.

On the basis of the positional information after the conversion, the block images are sequentially output from the image memory unit 8. Thus, for example, the printer which is the output destination can output the image which is obtained by entirely rotating or reversing the former image.

In the second embodiment, the structure of the image processing apparatus is the same as that of the image processing apparatus in the first embodiment shown in FIGS. 1 to 5, whereby explanation of the parts corresponding to those in the first embodiment will be omitted.

In the second embodiment, as well as the first embodiment, the two-dimensional image is represented by the aggregate of the pixel data, all the pixel data are one-dimensionally arranged, and the pixel data are then transferred in synchronism with the clock signal.

It should be noted that, in the drawings necessary for the explanation of the second embodiment, the same components as those in the first embodiment are respectively denoted by the same numerals, and explanations thereof are omitted.

Figure 18:
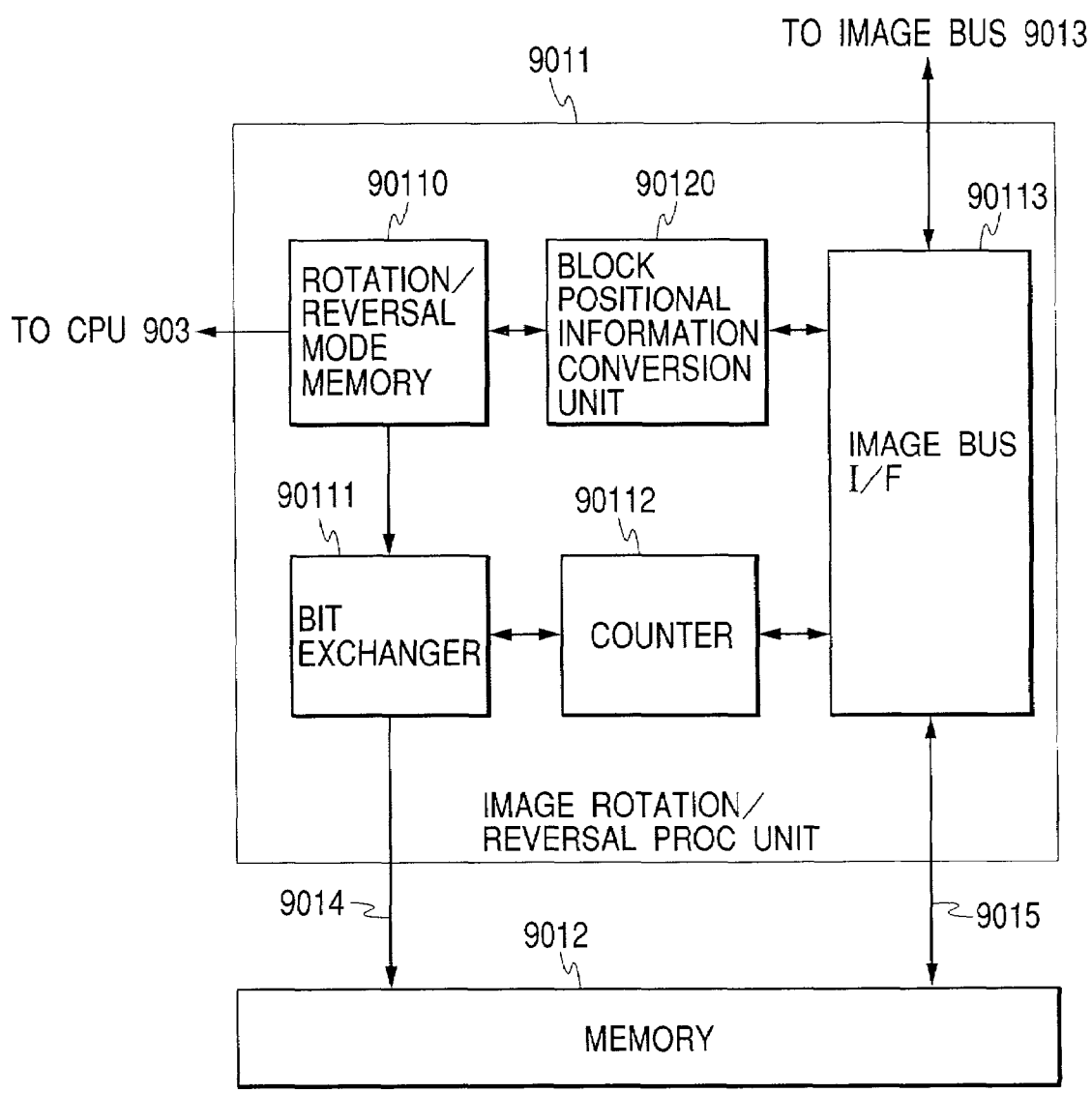
FIG. 18 is a block diagram showing an internal structure of an image rotation/reversal processing unit in the image processing apparatus according to the second embodiment of the present invention.

FIG. 18 is a block diagram showing the internal structure of the image rotation/reversal processing unit 9011 of FIG. 5. In FIG. 18, numeral 90110 denotes the rotation/reversal mode memory, numeral 90111 denotes the bit exchanger, numeral 90112 denotes the counter, numeral 90113 denotes the image bus I/F, and numeral 90120 denotes a block positional information conversion unit.

In FIG. 18, the data flow of the former image to the image rotation/reversal processing unit 9011 is as follows. In the image data and the positional information added to the image data which are input from the image bus 9013 to the image rotation/reversal processing unit 9011, the image data is transferred to the data bus 9015 through the image bus I/F 90113. The block positional information input from the image bus 9013 to the image rotation/reversal processing unit 9011 is transferred to the block positional information conversion unit 90120 through the image bus I/F 90113.

Next, the image data flow after the image rotation/reversal process is as follows. The image data which is read and input from the memory 9012 to the image rotation/reversal processing unit 9011 through the data bus 9015 is transferred to the image bus 9013 through the image bus I/F 90113. Further, the block positional information which is output from the block positional information conversion unit 90120 is added to the image data, and then transferred to the image bus 9013 through the image bus I/F 90113.

Next, the operation in the image rotation/reversal process is as follows.

The output from the counter 90112 outputting the ascending-order binary numbers is further output to the address bus 9014 through the bit exchanger 90111, so as to control the writing and reading addresses in the memory 9012. The bit exchanger 90111 is the bit arrangement changer which changes the order of input bit data and outputs the data in the changed order. The bit exchanger 90111 which has the function to rearrange the input bit data for each bit and the function to perform bit reversal of the value of each bit data is controlled by the rotation/reversal mode memory 90110. The rotation/reversal mode memory 90110 consists of the register of which the contents can be rewritten and read by the CPU 903, and acts as the part to determine the operation of the image rotation/reversal processing unit 9011.

The block positional information conversion unit 90120 which is controlled by the rotation/reversal mode memory 90110 performs the conversion to the block positional information transferred through the image bus I/F 90113, and then transfers the converted block positional information to the image bus 9013 through the image bus I/F 90113.

As well as the first embodiment, FIG. 7 schematically shows one block. In the present embodiment, the image area of 16 pixels in the horizontal direction and 16 pixels in the vertical direction is handled as one block. Each of the small squares shown in FIG. 7 corresponds to each of the pixels constituting one block, and the uniquely determined pixel number is added to each of the pixels. When the block image is transferred through the image bus 9013, the pixels are sequentially transferred in the order of smaller pixel number. The details of the transfer through the image bus 9013 will be described later.

FIG. 19 is a diagram showing a case where the image is divided into the plural blocks and managed.

Hereinafter, a method of dividing the image data into the blocks and managing the divided blocks will be explained.

Under the control of the CPU 903, the image data stored in the image memory unit 8 is divided into the blocks each of which is a 16-pixel square, and the process is performed to each block. Since each block is managed based on a set of uniquely determined numbers (X, Y) by the CPU 903, the set of numbers acts as the positional information of this block in the image. Here, symbol X denotes the block number from the left along the horizontal direction based on zero origin representation, and symbol Y denotes the block number from the top along the vertical direction based on zero origin representation. FIG. 19 shows the block division diagram on which the positional information of each block is represented in the case where the image is divided into the plural blocks according to the above management method.

In the example shown in FIG. 19, an image is divided into ten blocks (i.e., 160 blocks) in the horizontal direction and eight blocks (i.e., 128 pixels) in the vertical direction. In this case, the number of blocks in the horizontal direction is "10", and the number of blocks in the vertical direction is "8".

When the image output by a print operation, a fax transmission operation or the like is performed, the image block stored in the image memory unit 8 is read one by one and output to the image output destination under the control of the CPU 903. At this time, the block of the positional information (0, 0) is first read and output without fail, and thereafter the blocks are read and output in the order of positional information number (1, 0), (2, 0), . . . , (9, 7). Therefore, if the image output operation such as the print operation or the like is performed after the positional information of each block is rewritten and thus the order of blocks is changed, the blocks stored at the arbitrary positions in the memory can be sequentially output in the desired order. Namely, by previously rewriting the positional information of the respective blocks to become the positional information after the rotation/reversal process, it is possible by the printer, the fax apparatus or the like to sequentially output the block images in the order from which the image rotation/reversal process is performed. Thus, by performing the two kinds of processes (i.e., the process to rewrite the positional information of each block and the process to rotate or reverse the image in each block) for all the blocks within a page, the image rotation/reversal process for the entire page image can be achieved.

FIGS. 20A to 20E show signal waveforms in the case where the block data is transferred through the image bus 9013. The image is transferred by each block, in synchronism with an image bus transfer clock. The positional information of the block is added to the head of its block data.

In FIGS. 20A to 20E, image data denoted by symbols "A" and "B" are the positional information.

Hereinafter, an image bus transfer procedure will be explained in accordance with an execution procedure of the image rotation/reversal process.

First, the former block data to which the image rotation/reversal process is to be performed is input to the image bus I/F 90113 through the image bus 9013. After the transfer of all the pixel data in one block ended, the block data which was subjected to the image rotation/reversal process is output to the image bus 9013 through the image bus I/F 90113.

In such the input step, an image bus transfer start signal is first sent from the image bus 9013 to the image bus I/F 90113, and at the same time the block positional information used as the image bus data and the pixel data constituting the block are sequentially transferred.

In the output step, a transfer request signal and an image bus transfer request signal are output from the image bus I/F 90113 to the image bus 9013. Since the image bus which received these request signals outputs an image bus transfer permission signal, the image bus I/F 90113 which received the permission signal continuously outputs and transfers the image bus transfer start signal, the block positional information, and the pixel data constituting the block.

The image bus data of FIG. 20A represents the former positional information of the block, and the image bus data of FIG. 20B represents the positional information after the image rotation/reversal process of the block. In the drawings, numerals "0" to "255" denote the pixel data respectively.

The output pixel arrangement in FIGS. 20A and 20C is the arrangement in the case where the image rotation process of 90° counterclockwise is performed. Such the arrangement and other image rotation/reversal processes will be described later.

Hereinafter, the procedures of performing the image rotation process and the image reversal process in the data processing unit 901 will be explained.

When the image rotation/reversal process is performed, the CPU 903 causes all the blocks to be subjected to the image rotation/reversal process in the order of block positional information or inconsecutively. In this case, since the image rotation/reversal process is performed by each block, the process of each block is independently performed.

As well as the first embodiment, the procedure of the image rotation/reversal process for one block will be explained.

The CPU 903 sends the positional information of the block to be processed to the I/F 900 so as to request the block data creation. Then, the I/F 900 reads the pixel data corresponding to the block positional information from the image memory unit 8, creates the block data based on the read pixel data and the corresponding positional information, and transfers the created block data to the image rotation/reversal processing unit 9011. The waveshape of the image bus signal at this time is shown in the former part of FIGS. 20A to 20E.

The block positional information input to the image rotation/reversal processing unit 9011 is then transferred to the block positional information conversion unit 90120 through the image bus I/F 90113. The block image data input in the image rotation/reversal processing unit 9011 is stored in the memory 9012 through the image bus I/F 90113. Here, as the memory 9012, a general-purpose memory which is controlled by the address bus 9014 and the data bus 9015 is used.

After the image data of one block (i.e., 256 pixels) was received, the image rotation/reversal processing unit 9011 starts to read the image data for each pixel from the memory 9012. Here, by the control of the address bus 9014 to the memory 9012, the order of reading the pixel data is made different from the order of writing the pixel data. The image rotation/reversal process is achieved by such the control. For example, if the pixel data is read in the order completely opposite to the order of writing the data, the image rotated by 180° can be obtained. Further, if the pixel data is read in the order completely same as the order of writing the data, the image rotated by 0° (i.e., not subjected to the image rotation/reversal process) can be obtained. The details of such operations will be described later.

The read image data is transferred to the I/F 900 through the image bus 9015 subsequent to new block positional information converted by the block positional information conversion unit 90120. The waveshape of the image bus signal at this time is shown in the latter part of FIGS. 20A to 20E.

The I/F 900 interprets the positional information of the block, and writes the block pixel data in the corresponding image memory area.

Next, how to access the memory 9012 achieving the image rotation/reversal process will be explained in detail.

The image rotation/reversal processing unit 9011 has the two operation steps, i.e., the image data input step and the image data output step.

In the image data input step, as described above, the image data for each pixel is input to the image rotation/reversal processing unit 9011 through the image bus 9013. Further, in the image data output step, as described above, the image data is output from the image rotation/reversal processing unit 9011 through the image bus 9013.

These two operation steps will be explained hereinafter with reference to FIG. 18 being the block diagram showing the structure of the image rotation/reversal processing unit 9011.

In the image data input step, the image rotation/reversal processing unit 9011 writes the pixel data sequentially input in the order shown in FIG. 7 in the memory 9012. At this time, the address of the pixel number shown in FIG. 7 is used as the writing address such that the writing address becomes unique with respect to each pixel data. Concretely, the bit exchange in the bit exchanger 90111 is set to be through, and the output completely same as the output of the counter 90112 is transferred to the address bus 9014, whereby the pixel data is written in the memory 9012. After the transfer of all the pixel data ended and the writing of all the pixel data in the memory 9012 ended, the operation step of the image rotation/reversal processing unit 9011 is changed to the image data output step.

In the image data output step, the image rotation/reversal processing unit 9011 sequentially reads the image data from the memory 9012, and transfers the read data for each pixel through the image bus 9013. In this case, the reading order of the data from the memory 9012 and the transferring order of the data to the image bus 9013 are controlled as follows according to a kind of rotation process performed to the image data and whether or not the reversal process is performed.

When the image rotation process of 90° counterclockwise is performed, the data is read and transferred in the order indicated by the pixel block of 16-pixel square shown in FIG. 8, i.e., the order of "15", "31", "47", "63", "79", "95", "111", "127", "143", "159", "175", "191", "207", "223", "239", "255", "14", "30", "46", . . . , "208", "224" and "240".

Similarly, when the image rotation process of 180° counterclockwise is performed, the data is read and transferred in the order indicated by the pixel block of 16-pixel square shown in FIG. 9. When the image rotation process of 270° counterclockwise is performed, the data is read in the order indicated by the pixel block of 16-pixel square shown in FIG. 10. Further, when the image reversal process is performed, the data is read in the order indicated by the pixel block of 16-pixel square shown in FIG. 11. Further, when the image rotation process of 90° counterclockwise is performed after the image reversal process was performed, the data is read in the order indicated by the pixel block of 16-pixel square shown in FIG. 12. Similarly, when the image rotation process of 180° counterclockwise is performed after the image reversal process was performed, the data is read in the order indicated by the pixel block of 16-pixel square shown in FIG. 13. When the image rotation process of 270° counterclockwise is performed after the image reversal process was performed, the data is read in the order indicated by the pixel block of 16-pixel square shown in FIG. 14. Concretely, the bit exchange is controlled by the bit exchanger 90111 according to the list shown in FIG. 15. Thus, the address of the corresponding order is output to the address bus 9014, the pixel data is read from the memory 9012 in the desired order, and the read data is transferred to the image bus 9013 through the image bus I/F 90113.

Since FIG. 15 was explained in the first embodiment, further explanation here is omitted. Further, since the structure of the bit exchanger 90111 was already described with reference to FIG. 17, further explanation here is omitted.

Next, a conversion procedure of the block positional information will be explained in detail.

The former block positional information transferred from the image bus 9013 at the first of the image data input step is transferred to the block positional information conversion unit 90120 through the image bus I/F 90113. Then, while the block image data from the image bus 9013 at the remainder of the image data input step is being written in the memory 9012 through the image bus I/F 90113, the block positional information conversion unit 90120 creates new block positional information. Then, at the first of the image data output step, it is set to be able to transfer the new block positional information to the image bus 9013 through the image bus I/F 90113. It should be noted that the conversion of the block positional information performs the control corresponding to the kind of image rotation/reversal process.

FIG. 21 shows a block position information conversion method list for types of image rotation/reversal processes. Such the conversion method can be performing by adders and bit reversal circuits as shown in FIG. 21, the block positional information conversion unit 90120 can be easily achieved by using the selector circuit operating in correspondence with the image rotation/reversal process.

Further, two kinds of numerals necessary in the conversion methods (i.e., the number of blocks in the horizontal direction and the number of blocks in the vertical direction, these blocks constituting the entire image) are previously written in a register of the image rotation/reversal processing unit 9011 and used in the conversion process under the control of the CPU 903. The number of blocks represents the number of blocks in each of the horizontal and vertical directions constituting the former image before the image rotation/reversal process is performed. For example, in the former image shown in FIG. 19, the number of blocks in the horizontal direction is "10", and the number of blocks in the vertical direction "8".

FIG. 22 is a diagram showing the case where the images divided into 10 blocks in the horizontal direction and eight blocks in the vertical direction shown in FIG. 19 are rotated counterclockwise by 90°. Namely, FIG. 22 shows the result which is obtained by converting the positional information (X, Y) of each block.

For example, it can be understood in FIG. 22 that, by the image rotation process of 90° counterclockwise, the positional information (0, 0) of the upper left block is converted into the positional information (0, 9), and similarly the positional information (1, 0) of its adjacent block is converted into the positional information (0, 8).

Next, the conversion of the positional information will be explained in detail.

In the transformations of FIG. 21, symbol X denotes a horizontal-direction number of the positional information of each block in the former image, symbol Y denotes a vertical-direction number of the positional information of each block in the former image, symbol X' denotes a horizontal-direction number of the positional information of each block in the rotated or reversed image, and symbol Y' denotes a vertical-direction number of the positional information of each block in the rotated or reversed image. It should be noted that the horizontal-direction number X and the vertical-direction number Y respectively correspond to the positional information (X, Y) of each block shown in FIG. 19, and the number is an integer starting from "0". Further, symbol XX denotes the number of total blocks of the former image in the horizontal direction, and symbol YY denotes the number of total blocks of the former image in the vertical direction. In the example shown in FIG. 19, the number XX is "10", and the number YY is "8".

The transformations in FIG. 21 are represented by formulae. In each formula, the result of calculating the value at the right side of the arrow (←) is given as the value at the left side. Namely, for example, in case of the image rotation process of 90° counterclockwise, since X'←Y and Y'←XX-1-X, it is represented that the block positional information is (Y, XX-1-X) after the block of which the block positional information is (X, Y) was rotated counterclockwise by 90°. Concretely, for example, if the image of FIG. 19 is rotated counterclockwise by 90°, the positional information (0, 10-1-0) is obtained by substituting the positional information (0, 0) of the upper left block for the transformation, this transformation is calculated, and thus the block after the rotation has the positional information (0, 9). Further, with respect to the adjacent block, the positional information (0, 10-1-1) is obtained by substituting the positional information (1, 0) of this block for the transformation, and thus the block after the rotation has the positional information (0, 8).

In FIG. 21, the circuit structure is expressed in graphical symbols and their connection lines. Namely, in this circuit structure, the signals X, Y, XX and YY input from the left are signal-processed to generate the signals X' and Y' output to the right. The graphic symbols in FIG. 21 are symbols which are generally used and indicate a buffer, an inverter (i.e., a bit reversal circuit), and an adder. It should be noted that, in this case, the buffer is an eight-bit input/eight-bit output buffer which directly outputs the input signal as it is, the inverter is an eight-bit input/eight-bit output inverter which inverts each bit of the input signal and outputs the obtained signal, and the adder is an eight-bit two-way input/eight-bit output adder which adds together the input two-way signals as positive numbers, throws away the carry information exceeding the eight bits, and outputs only the eight-bit information. Namely, for example, in case of the image rotation of 90° counterclockwise, the signal Y is directly output as the signal X', and the signal obtained by adding together the signal bit-inverted from the signal X and the signal XX is output as the signal Y'. Concretely, for example, in the case where the image of FIG. 19 is rotated counterclockwise by 90°, the positional information (X, Y)=(0, 0) of the upper left block, the number of total blocks in the horizontal direction (XX=10), and the number of total blocks in the vertical direction (YY=8) are input to the circuit configuration, and the positional information (X', Y') after the rotation process is obtained as the output signal. Here, since Y=0, the eight-bit signal Y is represented as "00000000" in binary. Since X=0, the eight-bit signal X is represented as "00000000" in binary. Since XX=10, the eight-bit signal XX is represented as "00001010" in binary. Since YY=8, the eight-bit signal YY is represented as "00001000" in binary. Therefore, as the signal X', the signal of "00000000" which is the same as the signal Y is output. As the signal Y', the signal of lower eight bits "00001001" of the result "100001001" obtained by adding together the signal "11111111" obtained by inverting each signal of the signal X and the signal XX is output. Namely, the positional information (0, 0) is converted into the positional information (0, 9) by this circuit.

The conversion of the positional information in other rotation and reversal can be easily performed by the circuits shown in FIG. 21.

Then, by selecting one of the plural circuits in accordance with the selected rotation/reversal process, the positional information can be easily converted.

As described above, in the image processing apparatus according to the second embodiment, the two-dimensional image is represented by the aggregate of the pixel data, all the pixel data are one-dimensionally arranged, and the pixel data are then transferred in synchronism with the clock signal. In such a system called an image separation system, the aggregate of the pixel data of m×n size (m, n are natural numbers) obtained by dividing the pixel data constituting the image is handled as the block, the image is divided into the plural blocks to be handled, and the block positional information representing the position where the corresponding block is set in the entire image is added to this block together with the pixel data. The image rotation/reversal processing unit 9011 for performing the image rotation/reversal process to the input block image and outputting the processed block image, and the block positional information conversion unit 90120 for converting the block positional information of the input block image and outputting the converted information are provided. The conversion process by the block positional information conversion unit 90120 corresponds to the image rotation/reversal process by the image rotation/reversal processing unit 9011. Then, the positional information representing the position where the block image should stand in the entire image after the image rotation/reversal process is output.

Thus, according to the image processing apparatus of the second embodiment, the block image is subjected to the image rotation/reversal process, and at the same time the positional information of the corresponding block is changed in the entire image. Thus, it is possible to omit a redundant procedure that the block image is once stored in the memory 9012 and then read again and rewritten at the correct position, whereby a processing time necessary in the image rotation/reversal process can be shortened. Also, parallel operations can be achieved. Namely, since the process for each block can be independently performed, even if there are image rotation/reversal requests to the plural images, such the requested processes can be simultaneously started and performed for each block in parallel. Further, by adopting the structure that the plural image rotation/reversal processing units are disposed, it is possible to end the processes for all the blocks in short time by performing the plural block processes in parallel, thereby having expansion for high-speed image rotation/reversal process.

In addition to the above first and second embodiments, the object of the present invention is applicable to a case where the storage medium recording program codes of software to realize the functions of the above embodiments is supplied to a system or apparatus, and then a computer (or CPU or MPU) in this system or apparatus reads and executes the stored program codes.

In this case, the program codes themselves read from the storage medium execute the functions of the above embodiments, whereby the storage medium storing these program codes constitutes the present invention.

As the storage medium from which the program codes are supplied, e.g., a floppy disk, a hard disk, an optical disk, a magnetooptical disk, a CD-ROM, a CD-R, a magnetic tape, a nonvolatile memory card, a ROM, or the like can be used.

Further, it is needless to say that the present invention includes not only the case where the functions of the above embodiments are executed by the program codes read by the computer, but also a case where an OS (operating system) or the like running on the computer executes a part or all of the actual processes based on instructions of the program codes and thus the functions of the above embodiment are executed by such the processes.

Further, it is needless to say that the present invention includes a case where the program codes read from the storage medium are once written in a memory provided in a function expansion board inserted in the computer or a function expansion unit connected to the computer, and then a CPU or the like provided in the function expansion board or the function expansion unit performs all or a part of the actual processes based on instructions of the program codes, whereby the functions of the above embodiments are achieved by such the processes.

As many apparently widely different embodiments of the present invention can be made without departing from the spirit and scope thereof, it is to be understood that the present invention is not limited to the specific embodiments thereof expect as defined in the appended claims.

What is claimed is:

1. An image processing method comprising:
    a numerical signal generation step of sequentially generating and outputting regular binary numerical signals in synchronism with a clock signal;
    a bit conversion step of generating and outputting, from the output signal in said numerical signal generation step being managed as an input signal, a signal that order of bits in the input signal has been exchanged or a signal that value of bit in the input signal has been reversed; and
    a control step of controlling the bit order exchange operation or the bit value reversal operation in said bit conversion step,
    wherein image data divided into pixel data and one-dimensionally arranged and stored in a memory is read and output in synchronism with the sequential operation in said numerical signal generation step, and the output signal generated in said bit conversion step is read and output as an address signal, so that a rotation and/or reversal process to a former image is performed.

2. A method according to claim 1, wherein an input two-dimensional image is represented by an aggregate of the pixel data, and all the pixel data are one-dimensionally arranged and transferred to the memory in synchronism with the clock signal.

3. A method according to claim 1, wherein, in said bit conversion step, plural kinds of bit conversions can be performed, and one of the plural kinds of bit conversions is selected and output according to an angle of rotation or a kind of reversal.

4. An image processing apparatus comprising:
    numerical signal generation means for sequentially generating and outputting regular binary numerical signals in synchronism with a clock signal;
    bit conversion means for generating and outputting, from the output signal of said numerical signal generation means being managed as an input signal, a signal that order of bits in the input signal has been exchanged or a signal that value of bit in the input signal has been reversed;
    control means for controlling the bit order exchange operation or the bit reversal operation of said bit conversion means; and
    storage means for storing image data, wherein the image data divided into pixel data and one-dimensionally arranged and stored in said storage means is read and output in synchronism with the sequential operation of said numerical signal generation means, and the output signal generated by said bit conversion means is read and output as an address signal, so that a rotation and/or reversal process to a former image is performed.

5. An apparatus according to claim 4, wherein an input two-dimensional image is represented by an aggregate of the pixel data, and all the pixel data are one-dimensionally arranged and transferred to said storage means in synchronism with the clock signal.

6. An apparatus according to claim 4, wherein said bit conversion means can perform plural kinds of bit conversions, and selects and outputs one of the plural kinds of bit conversions exchanges according to an angle of rotation or a kind of reversal.

7. An image processing method comprising:
    a numerical signal generation step of sequentially generating and outputting regular binary numerical signals in synchronism with a clock signal;
    a bit conversion step of generating and outputting, from the output signal in said numerical signal generation step being managed as an input signal, a signal that order of bits in the input signal has been exchanged or a signal that value of bit in the input signal has been reversed; and
    a control step of controlling the bit order exchange operation or the bit reversal operation in said bit conversion step,
    wherein image data is written in a memory in synchronism with the sequential operation in said numerical signal generation step and by using the output signal generated in said bit conversion step as an address signal, and the image data written in the memory is read according to addresses of predetermined order, so that a rotation and/or reversal process to a former image is performed.

8. An image processing apparatus comprising:
    numerical signal generation means for sequentially generating and outputting regular binary numerical signals in synchronism with a clock signal;
    bit conversion means for generating and outputting, from the output signal of said numerical signal generation means being managed as an input signal, a signal that order of bits in the input signal has been exchanged or a signal that value of bit in the input signal has been reversed;
    control means for controlling the bit order exchange operation or the bit value reversal operation of said bit conversion means; and
    storage means for storing image data, wherein the image data is written in said storage means in synchronism with the sequential operation of said numerical signal generation means and by using the output signal generated by said bit conversion means as an address signal, and the image data written in said storage means is read according to addresses of predetermined order, so that a rotation and/or reversal process to a former image is performed.

9. A storage medium which stores a control program to control an image processing apparatus, said program comprising:
    a numerical signal generation module of sequentially generating and outputting regular binary numerical signals in synchronism with a clock signal;
    a bit conversion module of generating and outputting, from the output signal in said numerical signal generation module being managed as an input signal, a signal that order of bits in the input signal has been exchanged or a signal that value of bit in the input signal have been reversed; and a control module of controlling the bit order exchange operation or the bit value reversal operation in said bit conversion module, wherein image data divided into pixel data and one-dimensionally arranged and stored in a memory is read and output in synchronism with the sequential operation in said numerical signal generation module, and the output signal generated in said bit conversion module is read and output as an address signal, so that a rotation and/or reversal process to a former image is performed.

10. A storage medium which stores a control program to control an image processing apparatus, said program comprising:

a numerical signal generation module of sequentially generating and outputting regular binary numerical signals in synchronism with a clock signal;

a bit conversion module of generating and outputting, from the output signal in said numerical signal generation module being managed as an input signal, a signal that order of bits in the input signal has been exchanged or a signal that value of bit in the input signal has been reversed; and a control module of controlling the bit order exchange operation or the bit value reversal operation in said bit conversion module, wherein image data is written in a memory in synchronism with the sequential operation in said numerical signal generation module and by using the output signal generated in said bit conversion module as an address signal, and the image data written in the memory is read according to addresses of predetermined order, so that a rotation and/or reversal process to a former image is performed.

11. An image processing method comprising:

an input step of inputting a block image and positional information of the block image;

an image rotation and/or reversal processing step of rotating or reversing the input block image by a block, and outputting the rotated or reversed block image; and a conversion step of converting the positional information of the input block image into the positional information of the image after the rotation or the reversal, wherein the conversion in said conversion step is a process corresponding to the content of the image rotation or the image reversal in said image rotation and/or reversal processing step, and in the conversion, the positional information for the entire image before the rotation or the reversal where the block image stands is converted into the positional information for the entire image after the image rotation or the image reversal in said image rotation and/or reversal processing step, and the converted positional information is added to the rotated or reversed block image and output.

12. An image processing apparatus comprising:

input means for inputting a block image and positional information of the block image;

image rotation and/or reversal processing means for rotating or reversing the input block image by a block, and outputting the rotated or reversed block image; and conversion means for converting the positional information of the input block image into the positional information of the image after the rotation or the reversal, wherein the conversion by said conversion means is a process corresponding to the content of the image rotation or the image reversal by said image rotation and/or reversal processing means, and in the conversion, the positional information for the entire image before the rotation or the reversal where the block image stands is converted into the positional information for the entire image after the image rotation or the image reversal by said image rotation and/or reversal processing means, and the converted positional information is added to the rotated or reversed block image and output.

13. A storage medium which stores a control program to control an image processing apparatus, said control program comprising:

an input module of inputting a block image and positional information of the block image;

an image rotation and/or reversal processing module of rotating or reversing the input block image by a block, and outputting the rotated or reversed block image; and a conversion module of converting the positional information of the input block image into the positional information of the image after the rotation or the reversal, wherein the conversion in said conversion module is a process corresponding to the content of the image rotation or the image reversal in said image rotation and/or reversal processing module, and in the conversion, the positional information for the entire image before the rotation or the reversal where the block image stands is converted into the positional information for the entire image after the image rotation or the image reversal in said image rotation and/or reversal processing module, and the converted positional information is added to the rotated or reversed block image and output.

* * * * *

UNITED STATES PATENT AND TRADEMARK OFFICE
CERTIFICATE OF CORRECTION

PATENT NO. : 6,980,701 B1  Page 1 of 1
APPLICATION NO. : 09/895185
DATED : December 27, 2005
INVENTOR(S) : Naotsugu Itoh It is certified that error appears in the above-identified patent and that said Letters Patent is hereby corrected as shown below:

COVER PAGE:
(30) Foreign Application Priority Data, "2000/203883" should read -- 2000-203883 -- and "2000/203884" should read -- 2000-203884 --.

COLUMN 3:
Line 15, "image" should read -- an image --.

COLUMN 10:
Line 24, "like are" should read -- like that are --.

COLUMN 15:
Line 14, "be also" should read -- also be --.

COLUMN 23:
Line 17, "expect" should read -- except --.

COLUMN 24:
Line 11, "exchanges:" should be deleted; and
Claim 9, Line 56, "A storage" should read -- A computer readable storage --.

COLUMN 25:
Claim 10, Line 12, "A storage" should read -- A computer readable storage --; and
Claim 10, Line 31, "signal," should read -- signal --.

COLUMN 26:
Claim 13, Line 26, "A storage" should read -- A computer readable storage --.

Signed and Sealed this

Seventh Day of November, 2006

JON W. DUDAS
*Director of the United States Patent and Trademark Office*